(12) United States Patent
Moshitzky et al.

(10) Patent No.: US 11,683,329 B2
(45) Date of Patent: Jun. 20, 2023

(54) DETECTING MALICIOUS ACTIVITY ON AN ENDPOINT BASED ON REAL-TIME SYSTEM EVENTS

(71) Applicant: Palo Alto Networks, Inc., Santa Clara, CA (US)

(72) Inventors: Roni Moshitzky, Rehovot (IL); Elad Wexler, Givatym (IL); Marat Khousid, Rehovot (IL); Guy Pilosof, Shoham (IL)

(73) Assignee: Palo Alto Networks, Inc., Santa Clara, CA (US)

( * ) Notice: Subject to any disclaimer, the term of this patent is extended or adjusted under 35 U.S.C. 154(b) by 109 days.

(21) Appl. No.: 16/800,333

(22) Filed: Feb. 25, 2020

(65) Prior Publication Data

US 2021/0266339 A1 Aug. 26, 2021

(51) Int. Cl.
*H04L 9/40* (2022.01)

(52) U.S. Cl.
CPC ...... *H04L 63/1425* (2013.01); *H04L 63/0254* (2013.01); *H04L 63/0263* (2013.01); *H04L 63/1441* (2013.01); *H04L 63/20* (2013.01)

(58) Field of Classification Search
CPC . H04L 63/1425; H04L 63/0263; H04L 63/20; H04L 63/1441; H04L 63/0254; H04L 63/1408; H04L 63/1416; H04L 63/1433; G06F 21/564; G06F 21/552; G06F 21/566

See application file for complete search history.

(56) References Cited

U.S. PATENT DOCUMENTS

| | | | |
|---|---|---|---|
| 8,392,498 B2 | 3/2013 | Berg | |
| 8,607,340 B2 | 12/2013 | Wright | |
| 8,776,218 B2 | 7/2014 | Wright | |
| 8,910,238 B2 | 12/2014 | Lukacs | |
| 9,152,789 B2 | 10/2015 | Natarajan | |
| 9,740,852 B2* | 8/2017 | Mahaffey | G06F 11/3013 |
| 10,122,751 B2* | 11/2018 | King-Wilson | G06Q 40/08 |
| 2012/0041901 A1* | 2/2012 | Zhao | G06N 5/043 |
| | | | 706/10 |

(Continued)

OTHER PUBLICATIONS

Singh et al., "User Behavior Profiling using Ensemble Approach for Insider Threat Detection," 2019 IEEE 5th International Conference on Identity, Security, and Behavior Analysis (ISBA) Year: 2019 | Conference Paper | Publisher: IEEE.*

(Continued)

*Primary Examiner* — Roderick Tolentino
(74) *Attorney, Agent, or Firm* — Van Pelt, Yi & James LLP

(57) ABSTRACT

Techniques for detecting malicious activity on an endpoint based on real-time system events are disclosed. In some embodiments, a system/process/computer program product for detecting malicious activity on an endpoint based on real-time system events includes monitoring an endpoint for malicious activity using an endpoint agent, in which the endpoint comprises a local device; detecting malicious activity associated with an application on the endpoint based on real-time system events using the endpoint agent based on a set of rules; and in response to detecting malicious activity on the endpoint based on real-time system events using the endpoint agent, performing a security response based on a security policy.

21 Claims, 10 Drawing Sheets

(56) References Cited

U.S. PATENT DOCUMENTS

| | | | |
|---|---|---|---|
| 2013/0097704 A1* | 4/2013 | Gavrilut | G06N 3/02 |
| | | | 726/23 |
| 2014/0245374 A1* | 8/2014 | Deerman | H04L 63/20 |
| | | | 726/1 |
| 2017/0300690 A1* | 10/2017 | Ladnai | G06F 21/56 |
| 2017/0337376 A1 | 11/2017 | Reader | |
| 2018/0089437 A1* | 3/2018 | Baset | G06F 21/577 |
| 2019/0230100 A1* | 7/2019 | Dwyer | H04L 41/046 |
| 2020/0073740 A1* | 3/2020 | Ohana | G06F 11/0793 |
| 2020/0311268 A1* | 10/2020 | Kostyushko | G06F 21/561 |

OTHER PUBLICATIONS

Jiang et al., "A New Automatic Detection System Design of Malicious Behavior Based on Software Behavior Sequence," 2020 10th International Conference on Information Science and Technology (ICIST) Year: 2020 | Conference Paper | Publisher: IEEE.*
Kaspersky, Kaskpersky Enterprise Cybersecurity, Kaspersky Lab, The Protection Technologies of Kaspersky Endpoint Security, 2017, downloaded Feb. 23, 2020.

* cited by examiner

Behavioral Threat Protection Analysis from the Security Agent Console

702

⊕ Behavioral Threat Protection
   New

[Retrieve Data]

▤ Details  ⚔ Analysis  △ Exception  ✎ Comments  ⟲ History

Observed Behaviors for Rule: bloc.hworm2

| | |
|---|---|
| 10:48:31 PM<br>Dec 10, 2018 | › Script copied itself to another path and execute the copied script uz.exe |
| 10:48:31 PM | › Created a script file uz.exe |
| 10:48:31 PM | › Launched wscript.exe  wscript.exe |
| 10:48:31 PM | › Modified the Windows Registry to enable auto-start for a file in a user folder  wscript.exe |
| 10:48:32 PM | › Modified the Windows File System to enable auto-start  wscript.exe |
| 10:48:32 PM | › Modified proxy settings for Internet Explorer  wscript.exe |
| 10:48:32 PM | › Modified connections settings for Internet Explorer  wscript.exe |

FIG. 7

DETECTING MALICIOUS ACTIVITY ON AN ENDPOINT BASED ON REAL-TIME SYSTEM EVENTS

BACKGROUND OF THE INVENTION

Malware is a general term commonly used to refer to malicious software (e.g., including a variety of hostile, intrusive, and/or otherwise unwanted software). Malware can be in the form of code, scripts, active content, and/or other software. Example uses of malware include disrupting computer and/or network operations, stealing proprietary information (e.g., confidential information, such as identity, financial, and/or intellectual property related information), and/or gaining access to private/proprietary computer systems and/or computer networks. Unfortunately, as techniques are developed to help detect and mitigate malware, nefarious authors find ways to circumvent such efforts. Accordingly, there is an ongoing need for improvements to techniques for identifying and mitigating malware.

BRIEF DESCRIPTION OF THE DRAWINGS

Various embodiments of the invention are disclosed in the following detailed description and the accompanying drawings.

FIG. 7 is a screen diagram illustrating a behavioral threat protection analysis from a security agent console of an endpoint agent in accordance with some embodiments.

DETAILED DESCRIPTION

Figure 1:
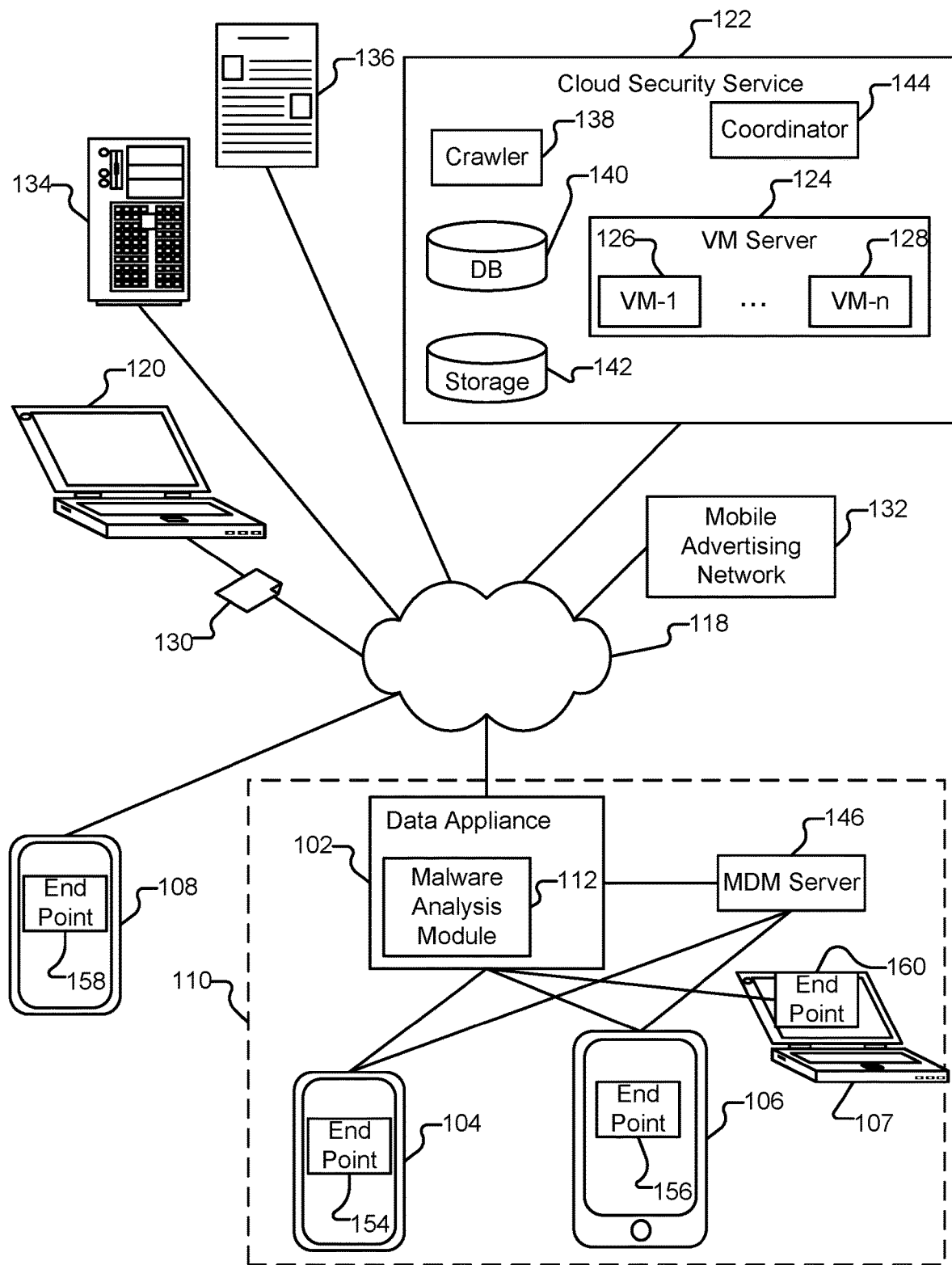
FIG. 1 illustrates an example of an environment in which malware is detected and prevented from causing harm in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Overview of Detecting Malicious Activity on an Endpoint Based on Real-Time System Events Malware as used herein generally refers to malicious software (e.g., including a variety of hostile, intrusive, and/or otherwise unwanted software). Malware can be in the form of code, scripts, active content, and/or other software. Example uses of malware include disrupting computer and/or network operations, stealing proprietary information (e.g., confidential information, such as identity, financial, and/or intellectual property related information), and/or gaining access to private/proprietary computer systems and/or computer networks. Malicious activity as used herein generally refers to activity associated with malware and/or other forms of anomalous activity.

Various endpoint security solutions generally exist. For example, an endpoint agent (e.g., security software) executed on an endpoint (e.g., endpoint device) is often provided for protecting the endpoint.

However, malware is constantly changing and evolving, and to protect from such malware, the endpoint agent generally has to be adapted and/or updated to be able to detect new forms of malware. As such, the endpoint agent generally should be sufficiently flexible to be able to be updated in a way that allows for new detection logic (e.g., new detection rules) to be timely and efficiently distributed to millions of protected endpoint devices (e.g., using a push and/or pull distribution mechanism to deploy such updates). In addition, updating the detection logic is typically performed by security analysts (e.g., a set of malware researchers, such as in a research group for a commercial security service provider) within a vendor company for the endpoint security solution, which can limit the capacity to quickly implement and deploy new security capabilities (e.g., to craft the new detection rules for new malware or other security threats).

Many of today's endpoint security solutions utilize code updates and new agent versions to deliver new security content. As a result, the typical time from identifying a security gap (e.g., malware or other security threats) to customer deployment of the code updates and new agent version to address the security gap can be on the order of four to six months.

As such, more timely and efficient techniques for deploying new security content for endpoint security solutions are desired. For example, it is desired to provide new techniques to provide timely and efficient updates to the endpoint agents to facilitate having the endpoint agents being able to prevent a new attack once they detect the attack once. Specifically, it is desired to provide a mechanism to provide new security content quickly to endpoint agents deployed by customers, without necessarily requiring binary updates (e.g., code updates) which generally may force recertification and upgrades from the customers.

Accordingly, new and improved techniques for detecting malicious activity on an endpoint based on real-time system events are disclosed as will be further described below. For example, to expand malware protection capabilities on endpoints, a new Behavioral Threat Protection (BTP) engine (e.g., a BTP component/module, which can be implemented in a high-level programming language, such as C++, Go, Java, or another high-level programming language, and is cross-platform, such as on the Microsoft Windows® operating systems, Apple MacOS® operating systems, Linux operating systems, etc.) is provided that provides a mechanism for detecting malicious activity on an endpoint based on real-time system events and which can be efficiently and timely updated using content updates (e.g., new detection rules) to detect new forms/types of malicious activity (e.g., without necessarily requiring binary/code updates).

In some embodiments, a system/process/computer program product for detecting malicious activity on an endpoint based on real-time system events includes monitoring an endpoint for malicious activity using an endpoint agent, in which the endpoint comprises a local device; detecting malicious activity associated with an application on the endpoint based on real-time system events using the endpoint agent based on a set of rules; and in response to detecting malicious activity on the endpoint based on real-time system events using the endpoint agent, performing a security response based on a security policy.

For example, the disclosed techniques for detecting malicious activity on an endpoint based on real-time system events can detect an attempt by the application to take an action that would violate the set of rules, in which the set of rules includes one or more updated detection rules.

As another example, the disclosed techniques for detecting malicious activity on an endpoint based on real-time system events can be configured to alert when a user connects to file servers that the user has not previously connected to based on an observed pattern of the user's network related activities (e.g., if the endpoint security agent starts to detect one or more host actions performed by an authenticated user that was not previously observed on this host machine, then the endpoint security agent can be configured to perform a responsive action, such as to log, alert, block, or perform some other responsive action(s)).

These and other for techniques for detecting malicious activity on an endpoint based on real-time system events will be further described below with respect to various embodiments.

Example System Environments for Detecting Malicious Activity on an Endpoint Based on Real-Time System Events FIG. 1 illustrates an example of an environment in which malware (e.g., malware content, malware applications, and/or other forms of malware) are detected and prevented from causing harm in accordance with some embodiments. The term "application" is used herein to generally refer to programs, bundles of programs, manifests, packages, etc., irrespective of form/platform. The term "malware" as used herein generally refers to an application and/or other dynamic/executable content that engages in behaviors, whether clandestinely or not (and, whether illegal or not), of which a user (or as applicable, an administrator or other entity specifying user device policies) does not approve/would not approve if fully informed. Examples of malware include viruses, rootkits, spyware, key loggers, etc.

Various example forms of malware exist including various forms of applications and/or other dynamic/executable content that engages in the above-described behaviors, whether clandestinely or not (and, whether illegal or not), of which a user (or as applicable, an administrator or other entity specifying user device policies) does not approve/would not approve if fully informed. One particular example of mobile malware (e.g., mobile app malware) is a malicious .apk file that appears to an end user to be a free game, but stealthily sends SMS premium messages (e.g., costing $10 each), running up the end user's phone bill. Another example of mobile malware is an application that stealthily collects the user's contacts and sends them to a spammer. Yet another example of mobile malware is an application that collects and reports to a remote server the end user's location (but does not offer a location based service to the user, such as a legitimate mapping service would provide). Other forms of malware can also be detected/thwarted using the techniques described herein. Further, while various techniques are, in some cases, described herein in conjunction with use of mobile devices (e.g., cellular telephones/tablet devices), use of techniques described herein is not limited to the context of any particular form/type of such endpoint devices. For example, techniques described herein can also be used in conjunction with applications used by other types of devices, such as laptop/desktop computers, gaming consoles, set-top boxes, Internet of Things (IoT) devices, etc. As one example, an end user computer (e.g., at a home, in a school, in an enterprise environment, etc.) can make use of the techniques described herein.

Suppose a nefarious individual wishes to propagate malware (such as malware 130) via system 120 to end users. A variety of approaches can be used by the nefarious individual. As one example, the individual can upload malware 130 to a software distribution platform such as platform 134 (also referred to as an "an app store"). The nefarious individual hopes that unsuspecting users of platform 134 (e.g., any of applicable client devices 104, 106, 107, and 108) will download the malicious application/content 130 from platform 134 and install it on their devices. Example embodiments of platform 134 include Google Play, the iOS App Store, BlackBerry World, the Windows Phone Store, the Microsoft Store, and the Amazon Appstore. Additional examples of software distribution platforms include third party software distribution platforms, such as the Baidu App Store, GetJar, and Handango. Another way the nefarious individual can attempt to propagate malware is by posting it on a message/forum site, such as site 136. In this scenario, the nefarious individual again hopes that unsuspecting users of site 136 will download and install the malicious application/content 130. Yet another way for the nefarious individual to attempt to propagate malware 130 is to attach it to an email message and hope that the recipient (e.g., the owner of device 104) will open the attachment and, for example, install the program. Yet another way for the nefarious individual to attempt to propagate malware 130 is to include it in an advertising company's ad network (e.g., mobile ad network 132) and hope that the user will install the promoted program.

In an example shown in FIG. 1, client devices 104 and 106 are a smartphone and a tablet (respectively) present in an enterprise network 110. Client device 108 is outside enterprise network 110. In this example, client device 104 runs an Android-based operating system (OS), client device 106 runs Windows 10, client device 107 runs a version of the Microsoft Windows® OS, and client device 108 runs a version of iOS. Each of the devices shown can be protected using techniques described herein. Other devices, running other operating systems, whether mobile-oriented or not, can also be protected using the techniques described herein. As will be described in more detail below, in various embodiments, endpoint protection is provided to each of devices 104, 106, 107, and 108. Such endpoint protection can be provided in a variety of manners and by a variety of entities, whether working individually, or in cooperation. For example, each of devices 104, 106, 107, and 108 can execute a program, or set of programs, providing endpoint protection services. The endpoint protection can be natively incorporated into the operating system running on the device (e.g., by the author of the operating system, the device manufacturer, or another appropriate entity including the operator of service 122), and can also be applied aftermarket (e.g., with the user or another appropriate entity installing an endpoint protection application or application suite on the device). Some examples of functionality provided by endpoint protection include local (to the device) firewalling, malicious application scanning, data loss/leakage prevention, sandboxing, etc. The endpoint protection application can make use of a variety of resources, including white/blacklists of MD5 or other hashes of known good/bad applications, stored in an appropriate storage location accessible to the endpoint protection application. The white/blacklists can be provided by a third party, such as an operator of service 122, and can also be configured by an administrator, by the user, etc., as applicable. In accordance with techniques described herein, and as described in more detail below, endpoint protection can integrate with remote services (e.g., offered by cloud security service 122) in providing protection to the device on which the endpoint protection is executing. In particular, endpoint protection applications 154, 156, 158, and 160 can monitor their respective local devices for various behaviors (e.g., using the BTP engine as will be further described below), and can determine whether such behaviors are suspicious/malicious based at least in part on information obtained from service 122 (e.g., threat logic based on a set of rules received from service 122 or configured by an IT/security admin for enterprise 110 as will be further described below). A variety of actions can be taken in response to such detections, as also described in more detail below. Using techniques described herein, the cloud security service 122 provides review services for applications, content, and/or other forms of malware, and the endpoint protection applications restrict the behaviors of the application/content (when executing in respective devices) to only those that have been reviewed and confirmed non-malicious by the cloud security service. For example, if an application, such as malicious application 130, attempts to bypass the analysis performed by the cloud security service, the malicious nature of the application will be caught by the endpoint protection application when the malicious application attempts to engage in malicious behavior on end user devices. Additional benefits include the endpoint protection application collecting additional behavior information from executing applications and reporting behaviors back to the cloud security service, and helping system administrators better determine which kinds of behaviors a given application will engage in after installation.

In some embodiments, data appliance 102 is configured to enforce policies regarding communications between clients such as clients 104, 106, 107, and 108, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website downloads, files exchanged through instant messaging programs, and/or other file transfers. In some embodiments, appliance 102 is also configured to enforce policies with respect to traffic that stays within enterprise network 110. In some embodiments, other devices are included in network 110, such as a mobile device management (MDM) server 146, which is in communication with data appliance 102.

As shown, MDM server 146 communicates with devices (e.g., 104 and 106) to determine device status and to report (e.g., periodically) such device status information to data appliance 102. MDM server 146 can be configured to report the presence of known malicious applications installed on devices such as device 104/106, and/or can be configured to receive indications of which applications are malicious (e.g., from appliance 102, from service 122, or combinations thereof). In some embodiments, data appliance 102 is configured to enforce policies against devices 104 and 106 based on information received from MDM server 146. For example, if device 106 is determined to have malware installed on it (e.g., by MDM server 146), data appliance 102 (working in cooperation with MDM server 146) can deny client 106 access to certain enterprise resources (e.g., an Intranet) while allowing device 104 (which does not have malware installed upon it) access to those resources. In various embodiments, data appliance 102 is configured to enforce policies against devices 104 and 106 based on information received from the devices themselves (e.g., as provided by endpoint security applications 154 and 156 respectively running on devices 104 and 106 to appliance 102). While MDM server 146 is shown in the environment of FIG. 1, the presence of an MDM server 146 is not required to implement various embodiments of techniques described herein, whether inside or outside an enterprise network setting. As one example, client device 107 (and is executing end point protection application 160) and client device 108 (which is outside enterprise network 110, and is executing end point protection application 158) can benefit from techniques described herein, as will be described in more detail below.

Figure 2:
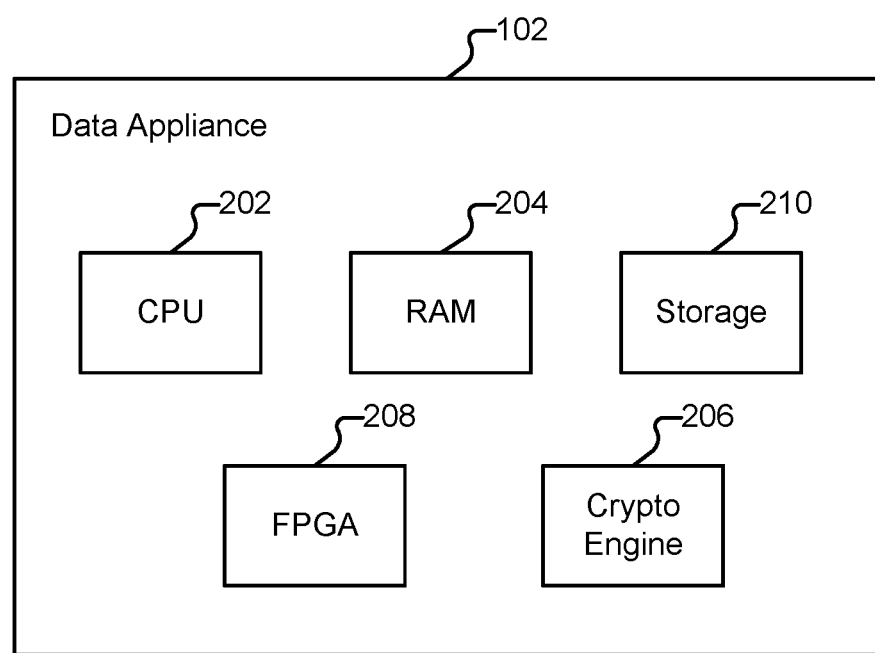
FIG. 2 illustrates a data appliance in accordance with some embodiments.

FIG. 2 illustrates a data appliance in accordance with some embodiments. The example shown is a representation of physical components that are included in appliance 102, in various embodiments. Specifically, appliance 102 includes a high performance multi-core CPU 202 and RAM 204. Appliance 102 also includes a storage 210 (such as one or more hard disks), which is used to store policy and other configuration information, as well as URL information. Data appliance 102 can also include one or more optional hardware accelerators. For example, data appliance 102 can include a cryptographic engine 206 configured to perform encryption and decryption operations, and one or more FPGAs 208 configured to perform matching, act as network processors, and/or perform other tasks.

Appliance 102 can take a variety of forms. For example, appliance 102 can be a single, dedicated device (e.g., as shown), and can also be a set of devices. The functionality provided by appliance 102 can also be integrated into or executed as software on a general purpose computer, a computer server, a gateway, and/or a network/routing device. For example, in some embodiments, services provided by data appliance 102 are instead (or in addition) provided to client 104 (or clients 106, 107, or 108) by an agent or other software executing at least partially on client 104 (or clients 106, 107, or 108), such as endpoint protection executing on any/all of clients 104, 106, 107, and 108 (e.g., applications 154, 156, 160, and 158, respectively). In an example implementation, the endpoint agents (e.g., such as a commercially available security endpoint agent, such as the Palo Alto Networks, Inc. provided Traps® agent) protect endpoints by preventing known and unknown malware from running on those endpoints and by halting any attempts to leverage software exploits and vulnerabilities (e.g., using the disclosed BTP engine and associated new techniques as further described below). The endpoint agents can enforce a security policy for the enterprise (e.g., enterprise 110). When a security event occurs on an endpoint, the agent collects forensic information about that event that you can use to analyze the incident.

Whenever appliance 102 is described as performing a task, a single component, a subset of components, or all components of appliance 102 may cooperate to perform the task. Similarly, whenever a component of appliance 102 is described as performing a task, a subcomponent may perform the task and/or the component may perform the task in conjunction with other components. In various embodiments, portions of appliance 102 are provided by one or more third parties. Depending on factors such as the amount of computing resources available to appliance 102, various logical components and/or features of appliance 102 may be omitted and the techniques described herein adapted accordingly. Similarly, additional logical components/features can be added to system 102 as applicable.

Suppose data appliance 102 intercepts an email sent by system 120 to device 104 to which a copy of malware 130 has been attached. (As an alternate, but similar scenario, data appliance 102 could intercept an attempted download by device 104 of malware 130 from platform 134 or site 136.) Data appliance 102 determines whether a signature for the attachment (i.e., malware 130) is present on data appliance 102. A signature, if present, can indicate that the attachment is known to be safe, and can also indicate that the attachment is known to be malicious. If no signature for the attachment is found, in some embodiments, data appliance 102 is configured to provide the attachment (malware 130) to a malware analysis module 112 for real-time analysis. As an alternate example, endpoint protection (e.g., any of 154, 156, 158, and 160) can detect when an attempt is made to install software (e.g., malware 130) on a device, and communicate (whether directly, or indirectly—such as through data appliance 102) with service 122 to determine information about the application, in accordance with techniques described herein.

As will be described in more detail below, a combination of static and dynamic analysis can be performed on applications such as application 130 to determine whether they are malicious. The analysis of malware 130 can be performed by a malware analysis module 112 included in data appliance 102, implemented as a set of one or more programs executing on appliance 102. Instead of or in addition to on-premise analysis, appliance 102 can also send a copy of malware 130 to cloud security service 122 for analysis. Cloud security service 122 can also (or instead) obtain copies of samples (e.g., mobile applications and/or other types of applications, web content/pages, shared files of various file types/formats, as well as other potential sources of malware, etc.) for evaluation from sources other than data appliance 102. As one example, cloud security service 122 can include a crawler 138 configured to periodically crawl platform 134 and/or site 136, looking for new or updated applications, web pages, etc. Such malware samples (an example of which is malware 130) can then be analyzed by cloud security service 122. In some embodiments, platform 134 and/or site 136 makes copies of malware samples available to cloud security service 122 via an Application Programming Interface (API) made available by service 122, instead of or in addition to crawler 138 obtaining such copies. Further, as will be described in more detail below, in various embodiments, devices 104, 106, 107, and/or 108 make copies of malware samples such as malware 130 available to cloud service 122 (or as applicable, to malware analysis module 112), such as in conjunction with a local user attempt to install a copy of the malware sample on the receptive device.

Copies of received malware samples (i.e., awaiting analysis) are stored in storage 142 and analysis is commenced (or scheduled, as applicable). As will be described in more detail below, results of the analysis (and additional information pertaining to the malware samples) are stored in database 140. In some embodiments, cloud security service 122 comprises one or more dedicated commercially available hardware servers (e.g., having multi-core processor(s), 8G+ of RAM, gigabit network interface adaptor(s), and hard drive(s)) running typical server-class operating systems (e.g., Linux). In various embodiments, service 122 is implemented across a scalable infrastructure comprising multiple such servers, solid state drives, and/or other applicable high-performance hardware. Cloud security service 122 can comprise several distributed components, including components provided by one or more third parties. For example, portions or all of cloud security service 122 can be implemented using the Amazon Elastic Compute Cloud (EC2) and/or Amazon Simple Storage Service (S3). Further, as with data appliance 102, when cloud security service 122 is referred to as performing a task, such as storing data or processing data, it is to be understood that a sub-component or multiple sub-components of cloud security service 122 (whether individually or in cooperation with third party components) may cooperate to perform that task. As one example, cloud security service 122 can optionally perform its analysis in cooperation with one or more virtual machine (VM) servers, such as VM server 124.

An example of a virtual machine server is a physical machine comprising commercially available server-class hardware (e.g., a multi-core processor, 4+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers cloud security service 122, but may also be provided by a third party. As one example, the virtual machine server can rely on EC2, with the remainder portions of cloud security service 122 provided by dedicated hardware owned by and under the control of the operator of cloud security service 122. As will be explained in more detail below, virtual machine server 124 is configured to provide one or more virtual machines 126-128 for emulating various types of endpoint devices. The virtual machines can execute a variety of operating systems and/or versions thereof. Observed behaviors resulting from executing samples (e.g., applications, content, etc.) in the virtual machines are logged and analyzed (e.g., for indications that the sample is malicious). In some embodiments, the log analysis is performed by the VM server (e.g., VM server 124). In other embodiments, the analysis is performed at least in part by other components of service 122, such as coordinator 144.

In some embodiments, cloud security service 122 makes available the results of its analysis of potential malware/malware activity via a list of signatures (and/or other identifiers) to appliance 102, to any/all of devices 104, 106, 107, and 108 (and/or to MDM server 146) as part of a subscription. For example, service 122 can send a content package that identifies malware periodically (e.g., daily, hourly, or some other interval, and/or based on an event based on a policy). An example content package includes a listing of identified malware (e.g., information in the content package for malware apps can include an app package name, an app hash code for uniquely identifying the app, and a malware name for each identified malware app). The subscription can cover the analysis of just those files intercepted by data appliance 102 and sent to cloud security service 122 by data appliance 102, and can also cover signatures of all malware known to cloud security service 122. Cloud security service 122 is configured, in various embodiments, to provide security services to entities in addition to or instead of an operator of data appliance 102. For example, cloud security service 122 can similarly perform the disclosed techniques for detecting malicious activity on an endpoint based on real-time system events, which will be further described below. As another example, the dynamic analysis of samples performed using cloud security service 122 can be utilized to generate new threat logic (e.g., a set of threat rules specified in a programming/scripting language, such as JavaScript or another programming/scripting language can be utilized, such as Python or Lua) that can be efficiently deployed as content updates to endpoint agents 104, 106, 107, and 108 as will also be further described below.

In the event malware 130 is determined to be malicious (whether by cloud security service 122 or by data appliance 102), appliance 102 can be configured to automatically block the file download based on the analysis result. As will be described in more detail below, in various embodiments, endpoint protection executing on devices 104, 106, 107, and 108 can similarly block a user of the respective devices from, for example, completing an install of the malicious application (instead of/in addition to relying on appliance 102 to prevent the downloading of the malicious application) and/or downloading the malicious file or malicious other content. Further, a signature can be generated for malware 130 and distributed (e.g., to other data appliances) to automatically block future file transfer requests to download the content/file determined to be malicious.

In some cases, the sample is malicious, but may not be (at least initially) flagged as malicious by cloud security service 122 (or malware analysis module 112 or other appropriate entity as applicable) during analysis. One reason for this is that malware authors increasingly use sophisticated techniques to conceal the malicious behaviors of their malware in order to evade detection by services such as service 122. As an example, a malicious application may attempt to reserve its malicious behavior for when the malicious application is executing on a victim's device. Even where service 122 can (e.g., through static and dynamic analysis) identify some of the concealment techniques on the part of malware authors, new approaches by malware authors to evade detection of the malicious nature of their applications are continuously being developed.

Suppose a typical malware analysis system can allocate five minutes to evaluating an arbitrary application for maliciousness (e.g., due to available resources, amounts of delay tolerated by users awaiting maliciousness verdicts, etc.). A malware author might suppress the expression of malicious aspects of an application for an hour, or a day, or longer, from the point the application is first installed and run on an end user device, and evade detection of the application's maliciousness accordingly. The amount of time the malicious behavior is suppressed can be programmed into the application (e.g., as a "sleep( )" or other routine), and can also rely on an external instruction, such as by having the application contact a command and control server. As another example of an evasion technique, malware can be configured to detect whether it is running in a virtualized environment (e.g., under the assumption that the malware is being observed for security analysis reasons in a VM such as VM 126) and only take benign actions if so. As yet another example, a malicious application may initially install with a minimum set of functionality, and then, once installed, download additional, malicious elements (e.g., as an update, as a patch, as an additional library, etc.). If an analysis system only analyzes the application in its initial form, malicious behaviors (e.g., as accomplishable by the malware once it has updated/patched itself) may go undetected. As will be described in more detail below, using techniques described herein, devices such as devices 104, 106, 107, and 108 can be protected from malicious applications, including those not initially determined to be malicious (e.g., those not flagged as malicious by an initial analysis by service 122) by performing the disclosed techniques for detecting malicious activity on an endpoint based on real-time system events, which will be further described below.

Analyzing Potential Malware

Figure 3:
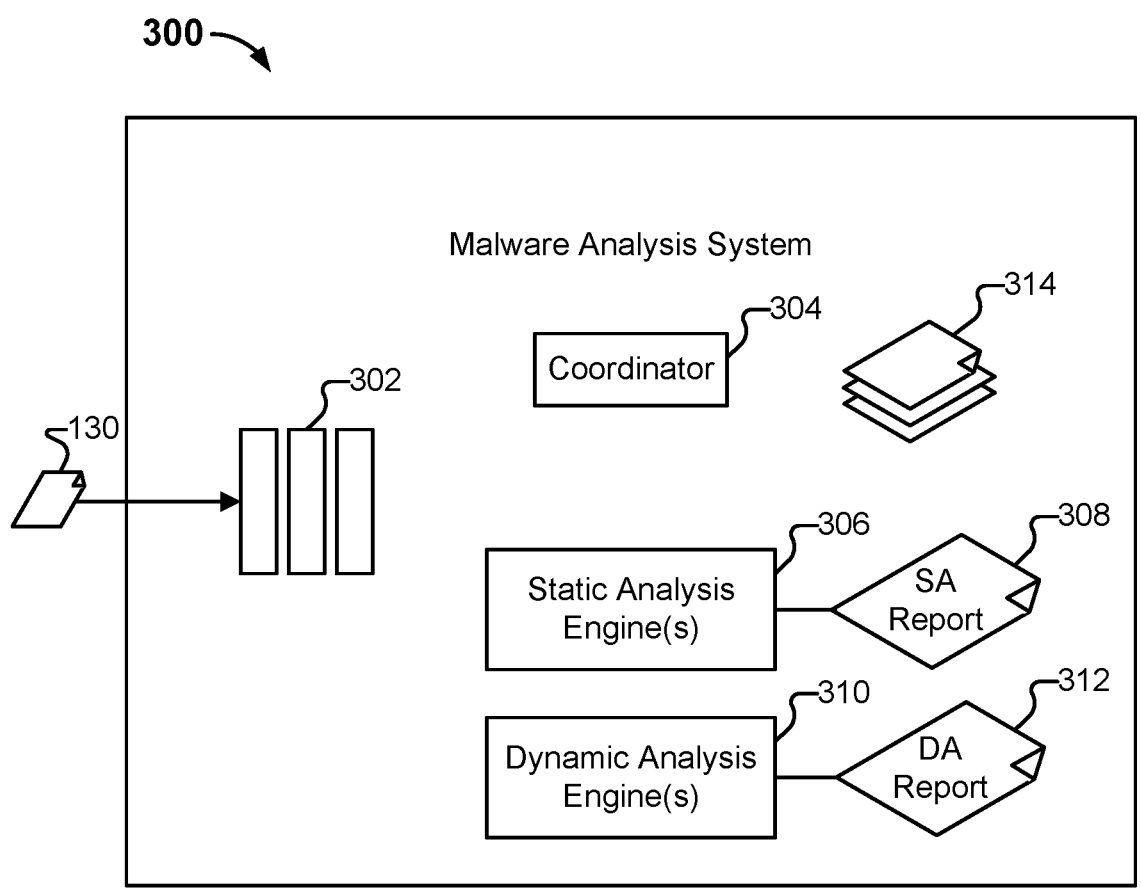
FIG. 3 illustrates an example of logical components included in a system for performing static and dynamic analysis on samples in accordance with some embodiments.

FIG. 3 illustrates an example of logical components included in a system for performing static and dynamic analysis on samples (e.g., potential malware, which may be files, applications, web pages/content, and/or various other content) in accordance with some embodiments. In various embodiments, system 300 is implemented using a single device. For example, the functionality of system 300 can be implemented on data appliance 102 which includes an analysis module 112. System 300 can also be implemented, collectively, across multiple distinct devices. For example, the functionality of system 300 can be provided by cloud security service 122.

As will be described in more detail below, in various embodiments, system 300 is configured to perform a hybrid, two part analysis on samples. First, static analysis is performed, in part to check, for example, the capabilities of the sample (e.g., for an application, such capabilities can be potential avenues for being malicious). Then, dynamic analysis is performed to check whether the sample performs any undesired and/or malicious activities/behaviors during execution (e.g., if the application actually uses the capabilities maliciously). The hybrid approach helps improve the accuracy of malware detection, while lowering the false positive rate of mislabeling benign samples as malware (e.g., due to harmless but poor programming techniques on the part of the application's author). An initial verdict pertinent to the sample can be made based on both the sample's content (e.g., where the application, file, web page, or other content includes a URL verified to be a malicious website), and on the context in which it behaves (e.g., whether the usage of a suspicious capability by the application is made aware to an end user or is performed silently in the background). As will be described in more detail below, in various embodiments, in the event that the verdict is that the sample being evaluated is malicious, the sample can be blocked from being accessed by and/or installed on a device such as any of devices 104, 106, 107, and 108 (e.g., by endpoint protection executing on the implicated devices). In the event that the verdict is not malicious, behaviors observed during analysis can be recorded and used to enforce limits on the sample (e.g., application) once installed, reducing the ability of a malware to engage in behaviors not observed during analysis.

In various embodiments, system 300 makes use of lists, databases, or other collections of known safe content and/or known bad content (collectively shown in FIG. 3 as collection 314). Collection 314 can be obtained in a variety of ways, including via a subscription service (e.g., provided by a third party) and/or as a result of other processing (e.g., performed by data appliance 102 and/or service 122). Examples of information included in collection 314 are: URLs of known malicious websites; URLs of known safe websites; signatures, hashes, and/or other identifiers of known malicious applications; signatures, hashes, and/or other identifiers of known safe applications; and signatures, hashes, and/or other identifiers of known malicious files (e.g. Android exploits files).

Ingestion

In some embodiments, when a new sample (or, as applicable, an updated one) is received for analysis (e.g., an existing signature associated with the sample is not present in system 300), it is added to processing queue 302. In the following example, suppose the application is called "game.apk," (the malicious game 130) but that it is not yet known whether or not the game is malicious. As explained above, a sample can be received for analysis in a variety of ways. As one example, a sample can be received by data appliance 102 for analysis when data appliance 102 intercepts an email or other data transmission intended for device 104 that includes the application. One additional example of the receipt of a sample is by service 122 of the application from data appliance 102, platform 134, or site 136 for analysis (e.g., via an API). Another additional example of receipt of a sample is crawling by service 122 of systems such as platform 134 or site 136. Yet another way a sample can be received for analysis is at the direction of endpoint protection executing on a device onto which an attempt to install the application is being made. For example, when users of any of devices 104, 106, 107, and 108 attempt to install new applications on their respective devices, endpoint protection executing on the devices can, upon notification of the attempted install, send a copy of the application to service 122 (e.g., via an API), can send a hash of the application to service 122 (e.g., to determine whether information pertinent to the application is already present e.g., in database 140), can provide a link to the source of the application (e.g., where the user is attempting to install the application from platform 134 or site 136), etc.

Static Analysis

Coordinator 304 monitors the queue, and as resources (e.g., a static analysis worker) become available, coordinator 304 fetches an application from queue 302 for processing (e.g., fetches game.apk). In particular, coordinator 304 first provides the application to static analysis engine 306 for static analysis. In some embodiments, one or more static analysis engines are included within system 300, where system 300 is a single device. In other embodiments, static analysis is performed by a separate static analysis server that includes a plurality of workers (i.e., a plurality of instances of static analysis engine 306).

One example of how static analysis can be performed, using game.apk (an Android application) as an example is as follows. Similar approaches can be used for applications executable on other platforms. First, the static analysis engine 306 uses a tool, such as Android apktool, to reverse game.apk into an intermediate source code form. The output of the reversing operation is, in some embodiments, a set of .smali files—the direct output of the disassembly from Java virtual machine language, and other resource files included in the game.apk file.

The static analysis engine obtains general information about the application, and includes it (along with heuristic information described below) in a static analysis report 308. The report can be created by the static analysis engine, or by coordinator 304 (or by another appropriate component) which can be configured to receive the information from static analysis engine 306. In some embodiments, the collected information is stored in a database record for the application (e.g., in database 140), instead of or in addition to a separate report 308 being created (i.e., portions of the database record form the report 308). Examples of collected information include: the package name, shared UID, APK file signer information, permissions claimed, and sensitive API calls included in the source (e.g., sending or erasing SMS messages, accessing the phonebook, and tracking user location changes). The static analysis engine also collects and stores information pertaining to the running context of the application, such as: the minimum version of the Android OS required to run the application (the minimum SDK version), and the sensors it will have access to.

The static analysis engine also retrieves (e.g., from database 140) a set of heuristic rules to be applied on the .smali code and the resource files. In particular, static analysis engine 306 determines which rules are triggered (also referred to as "features hit") by the source code. Examples of features include the following (where an example of "the received APK" is "game.apk"): contains known malicious APK file, file type mismatch, contains malicious executable files, requires abnormal permissions, contains malicious URL(s), etc.

The static analysis engine stores the results of the rule testing in a database (e.g., database 140) in the record associated with the application being tested (and/or includes the results in report 308 as applicable). In some embodiments, the static analysis engine also forms a verdict with respect to the application (e.g., "safe," "suspicious," or "malicious"). As one example, the verdict can be "malicious" if even one "malicious" static feature is present in the application. As another example, points can be assigned to each of the features (e.g., based on severity if found; based on how reliable the feature is for predicting malice; etc.) and a verdict can be assigned by static analysis engine 306 (or the coordinator, if applicable) based on the number of points associated with the static analysis results. A "safe" verdict can be alternately considered as a "nothing malicious (or suspicious, as applicable) detected" verdict. The potential exists, for example, that a clever malware author has crafted the app in such a way as to appear benign even when it is not. As will be described in more detail below, characteristics of an app deemed "safe" by system 300 can be recorded and used to generate rules that govern how the app, once installed on an end user device, is permitted to operate.

In some cases, an application may appear "suspicious" to static analysis engine 306 due to poor programming choices made by a harmless programmer, rather than a malicious one. As one example, the programmer may have named an executable that handles playing of an MP3 file with a ".mp3" extension. This sort of file type mismatch (i.e., that an executable is incorrectly labeled with a non-executable extension) could indicate malicious behavior (i.e., a malicious individual is trying to hide a malicious executable through misnaming the filename). Here, however, the file was inadvertently mislabeled. Static analysis engine 306 notes (e.g., with rule "File Type Mismatch" being included in the static analysis report) that there is a "suspicious" aspect to the file which warrants additional investigation during dynamic analysis to reach a conclusion as to whether the application is benign or malicious.

In some embodiments, static analysis engine 306 will conclude that the application will crash (and/or cause the virtual machine to crash) if executed. As one example, static analysis engine 306 can perform integrity checking and determine that a file is missing, corrupted, unsigned, etc. In this scenario, dynamic analysis can be skipped (e.g., with static analysis noting in report 308 that the application will crash if an attempt is made to install/execute it).

Dynamic Analysis

Once the static analysis is complete, coordinator 304 locates an available dynamic analysis engine 310 to perform dynamic analysis on the application. As with static analysis engine 306, system 300 can include one or more static analysis engines directly. In other embodiments, dynamic analysis is performed by a separate dynamic analysis server that includes a plurality of workers (i.e., a plurality of instances of dynamic analysis engine 310).

Each dynamic analysis worker manages a device emulator (e.g., running in a virtual machine, to emulate a device platform, such as a personal computing platform, such as Microsoft Windows OS®, Linux OS, Apple Mac OS®, etc., and/or a mobile computing platform, such as Apple iOS®, Google Android®, etc.). Results of the static analysis (e.g., performed by static analysis engine 306), whether in report form (308) and/or as stored in database 140, or otherwise stored are provided as input to dynamic analysis engine 310. The static report information is used to help customize the type of dynamic analysis performed by dynamic analysis engine 310, conserving resources and/or shortening the time required to evaluate an application. As one example, if static analysis has concluded that the application does not have the ability to access SMS messages, during dynamic analysis, the receipt of SMS messages will not be simulated in some embodiments. As another example, if static analysis has concluded that the application has the ability to access GPS information, during dynamic analysis, various changes in location of the device will be simulated. However, if the application lacks the ability to access GPS information, in some embodiments no location changes will be simulated (reducing the amount of time/computing resources needed to complete dynamic analysis). As yet another example, dynamic analysis engine 310 will determine which emulator (s) to run based on the minimum operating system version number required by the application (and determined during static analysis). If the minimum version number is Android 4.0, dynamic analysis engine 310 will launch an Android emulator having that version number (and, in some embodiments, will not attempt to emulate a lower version of Android). If the minimum version number is Android 2.3, multiple emulators can be used to evaluate the application (e.g., Android 2.3, and any higher versioned emulators, such as Android 4.0). Where multiple emulators are used, a single dynamic analysis engine can manage all of the emulators (whether in sequence or in parallel), or multiple dynamic analysis engines can be used (e.g., with each managing its own emulator), as applicable.

The dynamic analysis engine/worker begins analysis by preparing and setting up the running environment for the application to be tested. Examples of operations carried out by the dynamic analysis engine/worker at this point include: (1) determining which system services should be started (e.g., simulated motion sensor readings and simulated location changes); and (2) determining what set of simulated user operations should take place (e.g., performed after installation, in sequence).

The dynamic analysis engine/worker loads an appropriate emulator (e.g., Android version 2.3) and installs the application to be analyzed. The emulators used by malware analysis system 300 are instrumented. For example, they are configured to log activities as they occur in the emulator (e.g., using a customized kernel that supports hooking and logcat). Further, network traffic associated with the emulator is captured (e.g., using pcap).

The application is executed and various applicable actions (e.g., selected based on static analysis report 308) are performed (e.g., by the dynamic analyzer executing commands via an Android Debug Bridge ("adb") connection and/or through the use of a service coordinator included in the modified emulator and configured to orchestrate the simulation of user events such as button presses as commanded by the dynamic analysis engine). As one example, if the application was determined during static analysis to have access to location information, changes in location will be simulated in the emulator and any resulting behaviors logged. In some embodiments the log data is stored as a temporary file on system 300.

In some embodiments, dynamic analysis is performed in two stages. In particular, after the application has been installed and executed (with associated simulated information/events) and a first log file is created (e.g., "logcat1.txt"), a reboot of the emulator is performed and the application is launched and interacted with again, resulting in a second log file (e.g., "logcat2.txt"). Dynamic analysis engine 310 evaluates both log files, along with any network traffic captured during the two stages (e.g., using pcap).

Examples of features that can be detected during dynamic analysis include the following (where an example of "the received APK" is again "game.apk"): connecting to unknown and/or malicious websites, creating a malicious file, loading a malicious file, accessing hidden files or hidden folders, changing file permissions, and/or various other activities that can be monitored and detected during execution, including the disclosed monitored activities that can be detected using the BTP engine, such as further described below.

As with the static analysis engine, the dynamic analysis engine stores the results of the rule testing in the database in the record associated with the sample (e.g., application, content, etc.) being tested (and/or includes the results in report 312 as applicable). In some embodiments, the dynamic analysis engine also forms a verdict with respect to the sample (e.g., safe, suspicious, or malicious). As one example, the verdict can be "malicious" if even one "malicious" dynamic feature is present in the sample. As another example, points can be assigned to each of the features (e.g., based on severity if found; based on how reliable the feature is for predicting malice; etc.) and a verdict can be assigned by dynamic analysis engine 310 (or the coordinator, if applicable) based on the number of points associated with the static analysis results. As with static analysis, a "safe" verdict (e.g., determined during dynamic analysis) can be alternately considered as a "nothing malicious (or suspicious, as applicable) detected" verdict. The potential exists, for example, that a clever malware author has crafted the malware in such a way as to appear benign even when it is not. As will be described in more detail below, characteristics of a malware deemed "safe" by system 300 can be recorded and used to generate rules that govern how the malware, once installed/opened on an end user device, is permitted to operate.

In some embodiments, a final verdict associated with the sample is assessed (e.g., based on a combination of report 308 and report 312) by coordinator 304.

Figure 4:
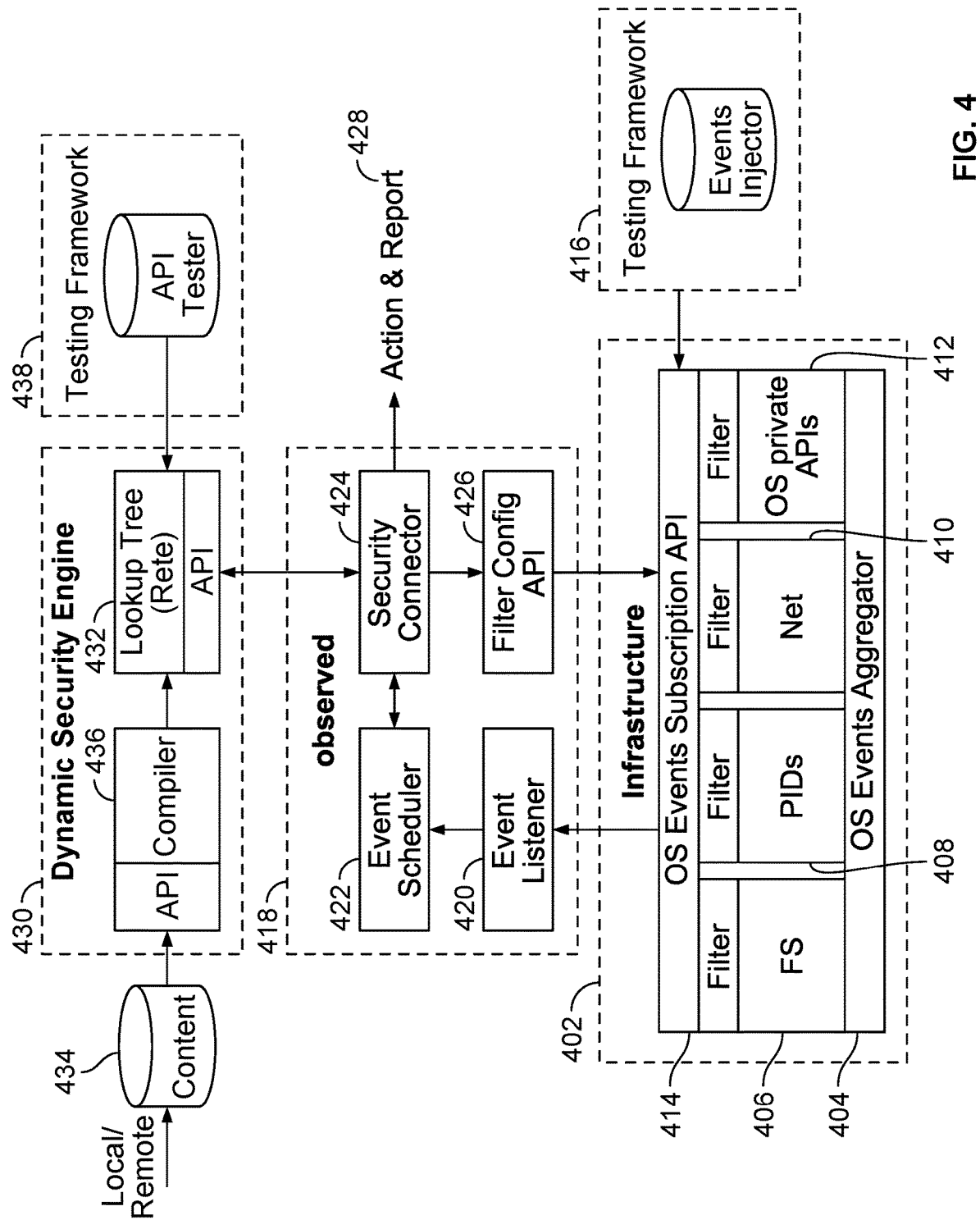
FIG. 4 illustrates an architecture of a Behavior Threat Protection (BTP) engine for detecting malicious activity on an endpoint based on real-time events in accordance with some embodiments.

Embodiments of a Behavior Threat Protection Engine Architecture for Detecting Malicious Activity on an Endpoint Based on Real-Time System Events FIG. 4 illustrates an architecture of a Behavior Threat Protection (BTP) engine for detecting malicious activity on an endpoint based on real-time events in accordance with some embodiments. In one embodiment, the BTP engine shown in FIG. 4 is a component of endpoint security agents 154, 156, 158, and 160 (e.g., and/or can be implemented using an instrumented emulation environment performing dynamic analysis, such as similarly described above with respect to cloud security service 122 of FIG. 1).

For example, the endpoint agent can perform behavioral threat protection by continuously monitoring various activities on the endpoint to identify and analyze a set of events (e.g., real-time events), such as a chains of events (e.g., referred to herein as causality event chains), as opposed to just a single event. This enables the endpoint agent to detect malicious activity in the set of events (e.g., a chain/pattern of events) that may otherwise appear legitimate if each of the events was merely inspected individually.

Referring to FIG. 4, the BTP engine (e.g., a component/module of endpoint security agents, such as the endpoint security agents described above) includes an Infrastructure module 402 that includes an OS Events Aggregator 404 for various events that are monitored and aggregated. A File System (FS) event and filter module 406 monitors and filters various file system events (e.g., file create, file delete, file open, file read, file write, and/or various other file system related events etc.) on the endpoint. A Process IDs (PIDs) event and filter module 408 monitors and filters various process related events (e.g., process create, process kill, and/or various other process related events) on the endpoint. A Network (Net) event and filter module 410 monitors and filters various process related events (e.g., network connection open, network connection close, and/or various other network related events) on the endpoint. An OS private Application Programming Interfaces (APIs) event and filter module 412 monitors and filters various OS private API related events (e.g., system OS kernel API calls, and/or various other OS private API related events) on the endpoint.

OS Events Subscription API 414 receives each of these aggregated and filtered events, which can be normalized (e.g., into a canonicalized format and flow) and then provided to an Event Listener 420 of an Events Observer (observd) module 418. In an example implementation, each of these filters can be configured using, for example, a YAML implemented filtering policy, which is received via a Security Connector 424 and Filter Config API 426. Various filtering policies can be configured to focus on events that may be more relevant for detecting security related events (e.g., to filter out/disregard events that may be too noisy and/or may not be useful indicators for malware detection using causality event chains). An example FS filter can include a configuration for filtering out/disregarding file read operations (e.g., except for in some cases, reading of specified files that may be more sensitive files or as another example a threshold number of reads to a database, etc.). For example, a number of events monitored in a typical endpoint's kernel and user space can be very high. As such, in order to facilitate a more efficient event matching process, the BTP engine includes various configurable filters for filtering out some of the events (e.g., uninteresting registry key hives, duplicate file-reads, etc.). In an example implementation, the disclosed event-based filtering techniques implement a Last Recently Used (LRU) caching algorithm (and data structure). Filtering values can be configurable by content (e.g., in an Agent configuration package) and can be changed by security analysts (e.g., a set of malware researchers, such as in a research group for a commercial security service provider) (e.g., and other sources) on demand.

Event Listener 420 provides the normalized set of filtered events to an Event Scheduler 422 that schedules event-based security detection analysis to be performed on the normalized set of filtered events using a Security Connector 424. Security Connector 424 applies security rules (e.g., behavioral threat rules) to the normalized set of filtered events to determine if there is a match with one or more of the security rules. Specifically, Security Connector 424 performs a pattern match analysis using a Lookup Tree 432 (e.g., implemented as a Rete tree that is compiled to provide optimized detection logic based on optimized decision trees) of a Dynamic Security Engine module 430. If there is a match, then an Action & Report 428 can be performed based on the configured action and/or reporting in the configured security rule that was determined to match based on the set of monitored real-time events on the endpoint.

In an example implementation, these security rules (e.g., behavioral threat rules) can be written in a scripting/rules-based language, such as JavaScript and stored as a JSON file as further described below, and can be matched based on regular expression (REGEX) matching using the CLIPs engine as will be further described below. The security rules can be created by a security analyst at a security service provider and/or by an enterprise IT/network/security admin and stored in a content data store (e.g., database) 434. The security rules can be provided to a Compiler 436 via an API of Dynamic Security Engine 430 for compiling Rete tree 432 as shown in FIG. 4.

In an example implementation, the causality chains that are malicious can be detected using the disclosed new behavioral threat rules that can be compiled and stored in a Rete tree for efficient pattern matching of real-time events on the endpoint. Any new and/or modified security rules (e.g., behavioral threat rules) can be efficiently provided as content updates (e.g., that can be received and compiled during execution/runtime, without necessarily requiring binary/code updates to the endpoint agents). Also, enterprise IT/network/security admins can configure the action(s) and/or reporting responses performed by the endpoint agent when a security rule pattern match is detected to perform the desired responsive action (e.g., kill the process, close the network connection, report the actions to the user and/or to an enterprise IT/network/security admin, quarantine the Causality Group Owner (CGO) which initiated the activity when the match was detected, etc.).

In this example, when the endpoint security agent (e.g., BTP engine) detects a chain of real-time monitored events that match a behavior threat rule, then the endpoint security agent performs the configured action and reports details about the activities that led to the security event (e.g., to alert on the attack, block the attack, report on/log the attack, notify an endpoint user of the attack via, for example, a pop-up window notification on the endpoint user interface, quarantine the endpoint being attacked, etc.). In an example implementation, users (e.g., IT/network/security admins) can review the entire causality chain up to the Causality Group Owner (CGO) on an Analysis tab of a security event or console of the endpoint security solution. In some cases, after analyzing the flow of events, if the IT/network/security admin believes that the behavior is legitimate, then they can configure a policy exception (e.g., Exception rule such as further described below) from the matched pattern of events to disable the behavior rule on the endpoint.

As such, the disclosed techniques facilitate a more flexible framework for detecting malware based on causality chains that facilitates updates using new detection logic (e.g., security rules including behavioral threat rules that can be efficiently distributed/pushed to the endpoint security agents as content updates without requiring an endpoint security agent upgrade or any downtime to the enterprise customers). Specifically, the new behavioral threat rules can be scripted (e.g., in JavaScript or another scripting language) to specify the causality chains for detecting malware activities on an endpoint based on a particular chain of real-time events (e.g., various events can be monitored on the endpoint device/system, such as file system operations, process creation and other process related events, injection operations, registry related operations, Remote Procedure Call (RPC) related operations, network connection related operations, and/or various other types of events), such as will be further described below.

Accordingly, in this example implementation, the disclosed techniques provide a more flexible framework for detecting malware that facilitates an improved mechanism for deploying new detection logic rapidly and without necessarily requiring binary/code updates. In addition, the new detection logic (e.g., new detection rules including dynamic event-based analysis rules, such as behavioral threat rules) can be scripted to facilitate content updates for detecting new forms of malware (e.g., the rules can be written, in the form of a script and the scripts can be remotely updatable to allow for rapid updating without having to necessarily perform binary/code updates to endpoint security agents). Moreover, the new detection logic can be scripted by security vendors (e.g., security analysis) as well as customers themselves (e.g., IT/network/security admins). Thus, the disclosed BTP dynamic engine incorporates both static and runtime characteristics/dynamic behavioral analysis of malware based on real-time events monitored on an endpoint device and can be remotely updated via a scriptable language, which allows for much greater flexibility in efficiently distributing new detection logic via content updates (e.g., incremental content updates that describe rules, features, and alerting events for matches for detecting malware, which can be provided as a relatively small JSON file that can be distributed/downloaded to the endpoint security agents) and reduces the response time to new threats as they come for the deployed endpoint security agents. Moreover, the disclosed BTP engine also allows other entities (e.g., IT/network/security admins of enterprise customers) to utilize this engine to push content of their own, thereby dramatically increasing the number of people who can contribute detection logic to the product.

As also shown in FIG. 4, for testing the BTP engine with existing and/or new/modified security rules (e.g., behavioral threat rules), a testing framework can (optionally) be provided. The testing framework can include an events injector 416 to inject a set of events for testing the BTP engine as well as an API Tester 438 for testing the pattern matching of the injected events with the existing and/or new/modified security rules.

Figure 5:
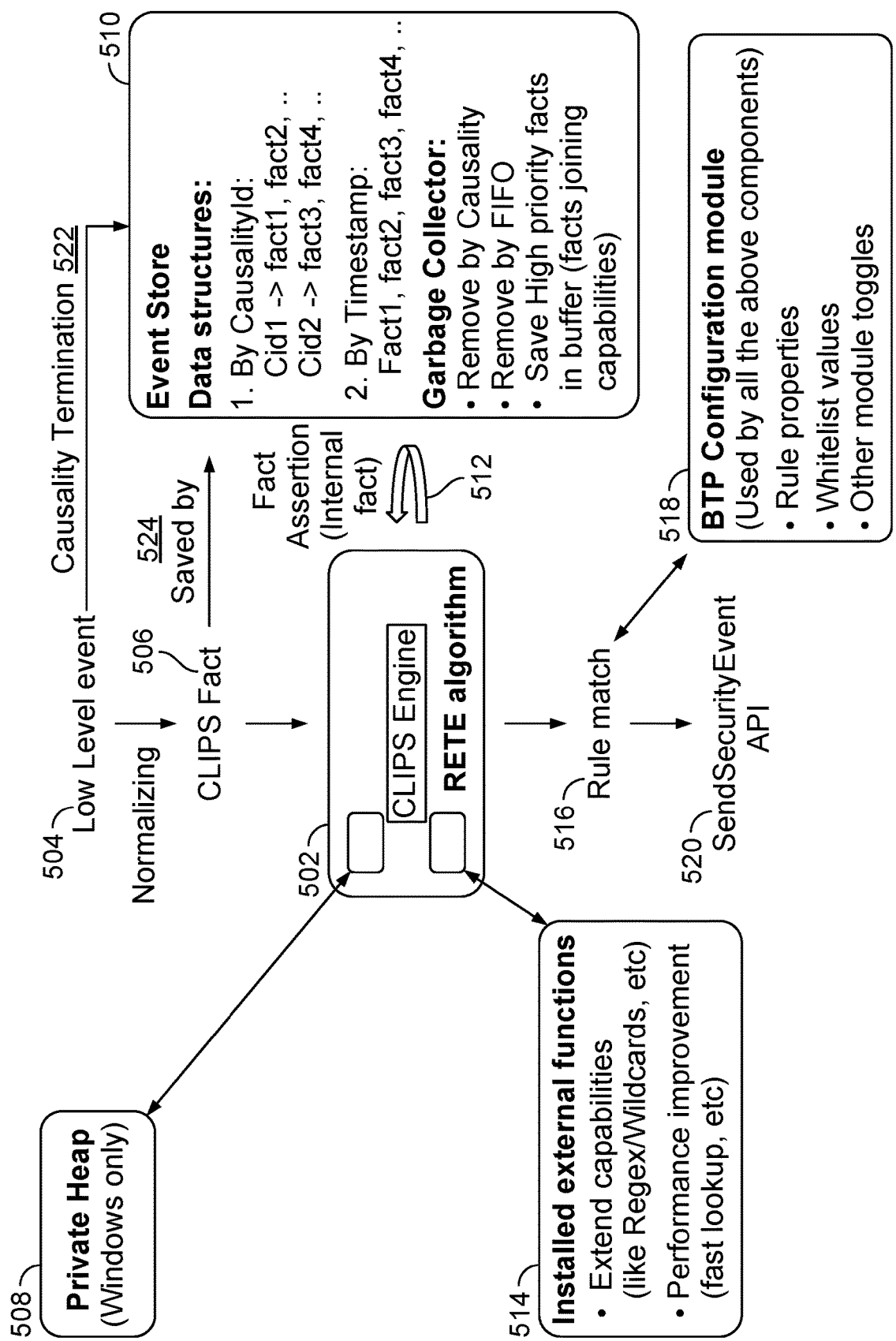
FIG. 5 illustrates an architecture flow of a Behavior Threat Protection (BTP) engine for detecting malicious activity on an endpoint based on real-time events in accordance with some embodiments.

FIG. 5 illustrates an architecture flow of a Behavior Threat Protection (BTP) engine for detecting malicious activity on an endpoint based on real-time events in accordance with some embodiments. In one embodiment, the BTP engine, such as shown in FIG. 4, and the architecture flow performed using the BTP engine as shown in FIG. 5 can be implemented as a component of endpoint security agents 154, 156, 158, and 160 (e.g., and/or can be implemented using an instrumented emulation environment performing dynamic analysis, such as similarly described above with respect to cloud security service 122 of FIG. 1). For example, the endpoint security agent can perform behavioral threat protection by continuously monitoring various activities (e.g., real-time events) on the endpoint to identify and analyze chains of events (e.g., also referred to herein as causality event chains or simply causality chains) as opposed to attempting to make security determinations based on only a single event. As similarly described above, this enables the endpoint security agent to detect malicious activity based on a monitored chain of events (e.g., a pattern of events) that may otherwise appear legitimate if each of the events were inspected individually/in isolation.

In one embodiment, the BTP engine is implemented in a high-level programming language as a cross-platform endpoint security component, such as for the Microsoft Windows® operating systems, Apple MacOS® operating systems, Linux operating systems, etc. In an example implementation, the BTP engine is implemented using an open source rules based tool, such as the C Language Integrated Production System (CLIPS) rule based expert system technology tool (e.g., CLIPS is an open source, public domain software tool that deals with rules and facts and is available at, for example, https://sourceforge.net/p/clipsrules/discussion/776945/thread/e001210c/?limit=25) as will be further described below.

In another embodiment, the BTP engine can be extended by external libraries to add capabilities (e.g., such as an optimized regexp matching library). In this example implementation, the BTP engine can be implemented as a separate library that can be used by other security products/solutions with similar or different requirements.

Referring to FIG. 5, the BTP engine includes a CLIPS Engine 502 that implements a RETE algorithm for performing rule matching based on a pattern of real-time security events as similarly described above. Monitored events are received as shown at Low Level event 504 (e.g., various types of events can be monitored, filtered, and aggregated as similarly described above with respect to FIG. 4). The events are normalized as described further below with respect to FIG. 6 and then provided as CLIPS Fact 506 to be provided as input facts to the CLIPS Engine as shown. The Clips Fact is the data structure format for input that can be processed by the Clips Interpreter component of the CLIPS Engine. As similarly described above, the BTP engine of the endpoint agent can perform various data pre-processing to support high speed evaluation (e.g., including filtering and normalization of the monitored real-time events, such as path Canonization and command line spaces removal).

The CLIPS Facts are stored as shown at 524 in an Event Store 510 in various data structures as shown (e.g., (1) By CausalityId; (2) By Timestamp; etc.). The Event Store can also perform various garbage collection to remove by Causality (e.g., in response to a Causality Termination as shown 522), remove by First In First Out (FIFO), and Save High priority facts in the buffer (e.g., facts joining capabilities) to efficiently manage storage space in the Event Store.

The CLIPs Engine can match a set of events to a rule(s) (e.g., behavioral threat rules) using the RETE algorithm. As similarly described above, these rules can be written in JavaScript and can be stored as a JSON file. The CLIPS Engine can also perform Fact Assertion (Internal fact) determinations as shown at 512. The following is an example for internal fact that can be inserted into the CLIPS Engine in order to "enrich" the engine knowledge and provide the ability to write additional clips rules based on this internal fact. Specifically, in this example we are detecting a behavior of a process that started to execute and generate a new file with the same hash (e.g., which means the process is a copy of itself).

```
(deftemplate internal.sig_copy_itself_by_hash (slot cid)
    (slot timestamp) (slot dbg_fact_id)(slot signed))
(defrule internal.sig_copy_itself_by_hash
    (and
    (process_start (cid ?cid)
        (timestamp ?ps_timestamp)
            (signer_name ?signer_name)
        (is_sign ?is_sign)
        (process_image_path ?ps_process_image_path)
        (image_path_sha256  ?ps_image_path_sha256&:(neq
            ?ps_image_path_sha256 nil)); same as in file_opera-
            tion
    )
    (test (not (is_whitelisted_process ?ps_process_image-
        _path ?signer_name))); should add 1 more process and
        check who wrote file?
    (test (not (is_installer_signer ?ps_process_image_path
        ?signer_name ?is_sign)))
    )
    ?the_f←
        (file_operation
        (cid ?cid)
        (timestamp  ?timestamp&:(>=?timestamp  ?ps_time-
            stamp))
        (sub_type  ?fo_sub_type&:(eq  ?fo_sub_type  ?*file-
            _write*))
        (file_path_hash ?ps_image_path _sha256); same as
            parent
        )
    =>
    (assert (internal.sig_copy_itself_by_hash (cid ?cid) (time-
        stamp ?timestamp) (dbg_fact_id (fact-index ?the_f))
        (signed (and (eq ?is_sign 1)(not (contains ?signer-
            _name "Microsoft"))))
    ))
)
```

As also shown, a Private Heap 508 for Windows-based endpoint implementations can be utilized for improved performance on a Microsoft Windows® operating system platform. For example, the Microsoft Windows® operating system provides the developer the ability to create a private heap which means all the memory allocation made with the specific heap ID (e.g., called HandleId) will be allocated only on this specific memory region and not on the default memory heap that each process in the system has. As such, using this private heap implementation can provide the following advantages: (1) easier to debug memory issues like memory-leaks, heap-corruptions, etc.; and (2) performance wise—by using a private memory region, we are limiting the heap fragmentation (e.g., a term of the OS system) as all the allocations/deallocations are almost on the same sizes (in contrary to the default heap of all the process where the allocations are very different as there are many allocators from many types).

As shown at 514, Installed external functions are also utilized to extend capabilities of the CLIPS Engine (e.g., for REGEX matching, Wildcards matching, etc.). As such, in this example implementation, the open source/public domain CLIPS Engine is extended to support regular expression (REGEX) matching. Another example of installed external functions that is utilized in this example implementation to extend the CLIPS Engine for performance improvement includes a fast lookup function.

At 516, the CLIPS Engine determines a Rules match with a set of events (e.g., a causality chain). At 520, a SendSecurityEvent API 520 action is performed in response to the Rule match determination. In this example implementation, in response to the Rules match with a set of events, the CLIPS Engine generates a SecurityEvent which can perform various actions based on configuration settings (e.g., generate a pop-up window with a console message to the user (on the endpoint), terminate the whole causality chain (the whole execution chain), generate an XDR UI event that presents the CGO (root process of the causality) and some of the internal behaviors made by the malware, etc.).

In this example implementation, the CLIPS Engine is configurable using a BTP Configuration module 518. For example, the BTP Configuration module can be utilized to configure rules (e.g., rule properties), to configure whitelist values, and/or to configure other module toggles (e.g., settings and/or parameters, etc.).

Event Filtering Performed by the BTP Engine

In one embodiment, to facilitate an efficient performance of the BTP (e.g., and entire endpoint security agent) in high load events environments, the agent filters out some of the irrelevant or less critical data (e.g., events). As also similarly described above, the event filtering is configurable/updatable. For example, if a new threat is detected in the wild, then the event filter(s) can be updated such that the desired events for detecting a causality chain associated with the new threat based on a new behavioral threat rule (or rule adjustment) can be performed by the BTP engine/agent to efficiently and timely detect this new threat.

In an example implementation, the following is an example for the syntax that can be used for the disclosed LRU filtering system (e.g., this syntax is YAML syntax). In the following example, the agent filters if a LoadImage event is signed by Microsoft and does not appear in the ignore list (e.g., internal ignore list as we would like to get some load images event by DLL signed by Microsoft). Another filter scenario is if a process is one of the names in the list (e.g., "chrome.exe" just pass it through the LRU, which means report it will be reported only once per 24 hours).

```
provider: image
lru:
  ttl: *24 hours
policy_version:
min: 8
label_bitmap: &ImageLoadLru 1
depth: 30000
```

```
attributes:
   location: [*AttrCommonCpaPolicy, *AttrCpaCausali-
      tyInstanceId] # TODO: can also put AttrCpaActorIn-
      stanceId instead
   location: [*AttrCommonCpaPolicy, *AttrCpaActorIma-
      geName]
   location: [*AttrCommonProviderData, *AttrImageFull-
      Name] rules:
# Drop images that are signed by microsoft except a
      whitelist of images
   action: drop
policy_version:
min: 9
conditions:
   attribute:
location: [*AttrCommonProviderData, *AttrImageSignatur-
   eState]
type: U64
condition: EQUAL
values:
   type: INT
value: *SignatureState_kSigned-attribute:
location: [*AttrCommonProviderData, *AttrImageSigna-
   tureVendor]
type: DATA
condition: EQUAL
values:
   type: STR
values: ["Microsoft Corporation"]-<<: *should_ignore_
   signed_image # Drop replay images from % systemdrive
   %\windows
   action: drop
policy_version:
min: 10
conditions:
   attribute:
location: [*AttrCommonProviderData, *AttrImageSignatur-
   eState]
type: U64
condition: EQUAI
values:
   type: INT
value: *SignatureState_kUnsupported-attribute:
location: [*AttrCommonIsReplay]
type: U64
condition: EQUAL
values:
   type: INT
value: 1-attribute:
location: [*AttrCommonProviderData, *AttrImageFull-
   Name]
type: DATA
condition: BEGINS
flags: [expand_env]
values:
   type: SIR
values: ["% windir %"]<<: *should_ignore_signed_image-
   action:
id: set-value
data:
value: *ImageLoadLru
location: [*AttrCommonLruLaelBitmap]
conditions:
   attribute:
location: [*AttrCommonCpaPolicy, *AttrCpaActorImage-
   BaseName]
``` type: DATA
condition: EQUAL
values:
   type: STR
values: ["chrome.exe", "firefox.exe", "iexplore.exe",
   "microsoftedge.exe", "microsoftedgecp.exe",
   "slack.exe"]

Whitelisting Performed by the BTP Engine

In one embodiment, the agent (e.g., and the BTP engine) is configured with a "trusted signer" whitelist. As also similarly described above, the "trusted signer" whitelist is configurable/updatable.

An example whitelisting configuration is illustrated below.

Figure 6:
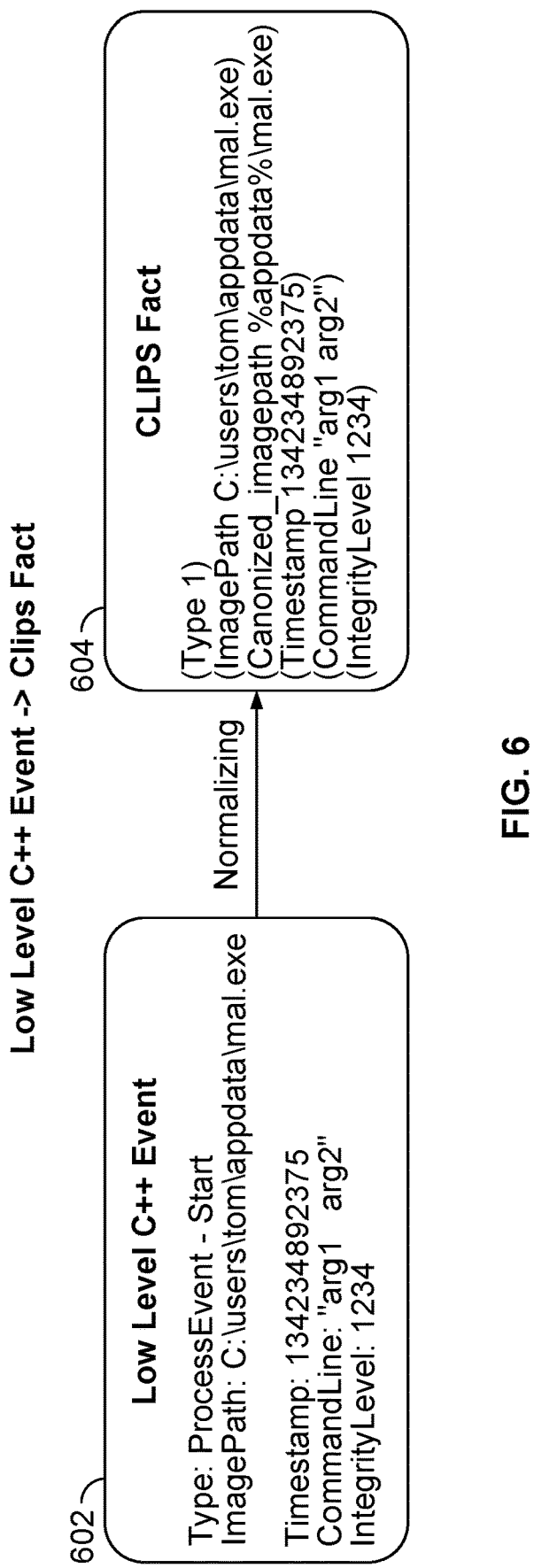
FIG. 6 illustrates a process for normalizing an event to a CLIPS Fact in accordance with some embodiments.

"Tencent Technology(Shenzhen) Company Limited",
"Baidu Online Network Technology (Beijing) Co., Ltd.",
"GE Intelligent Platforms, Inc.",
"Intel® Software Development Products",
"\"BITT\"LLC",
"1C Company",
"20-20 TECHNOLOGIES INC.",
"20-20 Technologies Inc.",
"2BrightSparks Pte Ltd",
"2BrightSparks Pte. Ltd.",
"2X Software Malta Ltd",
"360.cn",
"3D SYSTEMS, INC.", Event Normalization Performed by the BTP Engine FIG. 6 illustrates a process for normalizing an event to a CLIPS Fact in accordance with some embodiments. In one embodiment, this process for normalizing events to CLIPS Facts is performed by the BTP engine, such as similarly described above with respect to FIGS. 4 and 5. As shown in FIG. 6, a Low Level C++ Event 602 is normalized to a CLIPS Fact 604.

Rules for Detecting Malware on an Endpoint Based on Real-Time System Events Using the BTP Engine In one embodiment, the agent (e.g., and the BTP engine) is configured with various rules (e.g., behavior threat rules) for detecting malware (e.g., including new threats) on endpoints. As also similarly described above, the rules are configurable/updatable as content updates to facilitate more efficient and dynamic updates for new security threats.

An example malware that can be detected using the disclosed techniques is a sample of the "hworm" malware family that is detected by the behaviors it performs (e.g., by using the disclosed BTP engine implemented techniques, we can change this rule and make it more accurate by adding additional behaviors for detecting on the endpoint and distribute it to the field via content updates). This example rule also illustrates an example implementation for an "internal" rule which represents (one of) the behaviors, in this case, this is the script file creation that is detected by using the Low Level event of file-creation. The script file suffix can be changed anytime and by using this technique, we can easily add the new suffix name and catch the new malware variant. The disclosed BTP implemented techniques also facilitate the ability to correlate many event types and behaviors (on top of it), which thereby can be utilized to generate a complex decision tree (RETE tree) state that can be efficiently evaluated (e.g., in microseconds on a typical endpoint device). This example rule is now provided below.

```
(defrule bioc.hworm
"This rule catches behavior that is common in hworm
   samples"
(internal.external_cscript_or_wscript (cid ?cid))
(internal.create_script (cid ?cid))
(internal.autostart_from_local_dir (cid ?cid))
```

```
(internal.autostart_by_file_system_change (cid ?cid))
(internal.browser_proxy (cid ?cid))
(internal.ie_connection (cid ?cid)) (internal.create_doc_exe
    (cid ?cid))
(internal.start_doc_exe (cid ?cid))
(internal.unsigned_process_started (cid ?cid))
(internal.create_exe (cid ?cid))
(internal.double_extension (cid ?cid))
(internal.double_extension_executable (cid ?cid));(internal-
    .autostart_registry (cid ?cid))
;(internal.autostart (cid ?cid))
;(internal.copy_itself (cid ?cid))
;(internal.set_hidden_attribute (cid ?cid))
;(internal.create_hidden_file (cid ?cid))
;(internal.create_file_on_external_device (cid ?cid))
=>
;(bind ?*fires*(+?*fires*1))
)
(defrule internal.create_script
?the_f<-
(file_operation (cid ?cid) (timestamp ?timestamp)
(sub_type ?fo_sub_type&:(eq ?fo_sub_type ?*file_creat-
    e_new*))
(file_path ?fo_file_path&:(is_one_of_(file_ext ?fo_file_
    path) "vbs" "js" "jst" "vbe" "ps1"))
)
(not (internal.create_script (cid ?cid)))
=>
;FACTS_COUNTERS is 0, no bind ?the_f needed
(assert (internal.create_script (cid ?cid) (timestamp ?time-
    stamp) (dbg_fact_id (fact-index
?the_f))))
)
```

Another example rule for an event which is converted to a Clips Fact is the allocate_virtual_memory_remote, which is illustrated below.

```
(deftemplate allocate_virtual_memory_remote
(slot cid);stringBase64
(slot pid);int
(slot instance_id);stringBase64
(slot target_instance_id);String
(slot tid);int
(slot timestamp);long
(slot is_injected);0 or 1 (slot target_pid); String
(slot base_address); String
(slot region_size); String
(slot alloc_type); String
(slot prot_mask); String (slot event_id);stringBase64
(slot dse_internal);nil
#ifdef is_impersonated
(slot is_impersonated)
#endif#ifdef image_tracker
(slot base_address_mapped _image_path); String-get-
    _map_image_name on thread
start_address
(slot base_address _suspicious_symbol); String-get-
    _map_image _name on thread start_address
#endif#ifdef windows
#ifdef actor
(slot actor_pid)
(slot actor_instance _id)
(slot actor_tid)
(slot actor_thread _instance_id)
#endif
#endif
)
```

Yet another example rule is a rule for the bioc.file link exploit, which is based on a Windows exploit. In this example, once the exploit was discovered by our security analysts/research group, a new rule that can catch the malicious behavior was generated (e.g., in this example the attacker can take advantage of the file link feature and use it to exploit the WER (Windows Error Report) system) and after testing it, we deployed it in the wild using a Content update. This example rule is illustrated below.

```
(defrule bioc.file_link _exploit
    (process_start
        (cid ?cid)
        (instance_id ?instance_id)
        (integrity_level ?integrity_level&:
            (is_one _of
                ?integrity_level
                ?*integrity_low*
                ?*integrity_medium*
            )
        )
    )
    ?the_f<-(file_operation
        (instance_id ?instance_id)
        (sub_type ?fo_subtype&:(is_one _of ?fo_subtype
            ?*file_link* ?*file_sym _link*))
        (old_file_path ?fo_link _src)
        (canonized_old_file_path ?fo_canonized _link_src&:
            (not (starts_with _one_of ?fo_canonized _link_src
                "% programfiles"
                "% systemdrive"
                "% system32"
                "% windir"
            )
        )
    )
    (canonized_file_path ?fo_canonized_link _target&:
        (starts_with _one_of
            ?fo_canonized _link_target
            "% programfiles"
            "% systemdrive"
            "% system32"
            "% windir"
        )
    )
    (file_path ?fo_link_target&:
        (is_one_of (file_ext ?fo_link _target) "exe" "dll"
            "sys" "ini" "js" "ps1")
    )
    (timestamp ?fo_link_timestamp)
)
; Any access by a high-priv process using the FS link
    created by the low-priv process
(process_start
    (cid ?cid_priv)
    (instance_id ?instance_id_priv)
    (integrity_level ?integrity_level_priv&:
        (is_one _of
            ?integrity_level_priv
            ?*integrity_high*
            ?*integrity_system*
        )
    )
)
(file_operation
    (cid ?cid_priv)
    (instance_id ?instance_id_priv)
```

```
;(sub_type ?sub_type&:(is_one _of ?sub_type ?*fil-
    e_remove* ?*file_write*))
(file_path ?fo_link _src)
(timestamp   ?timestamp_priv&:(>=?timestamp_priv
    ?fo_link _timestamp))
)
(not (bioc.file_link _exploit (cid ?cid)))
=>
(assert (bioc.file_link _exploit (cid ?cid) (timestamp
    ?fo_link  _timestamp) (dbg_fact _id (fact-index
    ?the_f))))
)
```

Behavioral Threat Protection Analysis from the Security Agent Console

FIG. 7 is a screen diagram illustrating a behavioral threat protection analysis from a security agent console of an endpoint agent in accordance with some embodiments. In one embodiment, the security agent console shown in FIG. 7 is a component of endpoint security agents 154, 156, 158, and 160.

As shown in this example in the screen shot 702 of the security endpoint console in FIG. 7, the disclosed Behavioral Threat Protection (BTP) engine detects and performs an action(s) in response to detecting malware attack/threat activity by monitoring for malicious sequences/chains of events across processes, network activities, file system activities, etc. (e.g., and can be configured to terminate and/or report on such malware attacks/threats when detected). As shown in this example, when the security endpoint detects these malicious events, the security endpoint console presents a timeline of actions taken in an event analysis tab in the management console.

Figure 8:
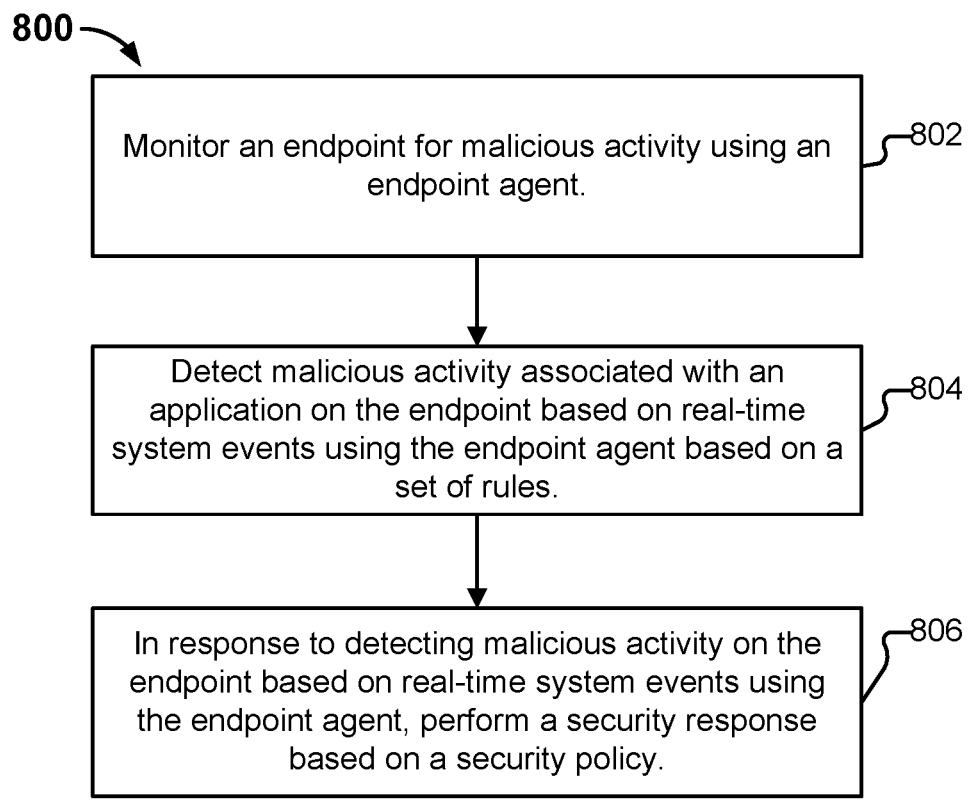
FIG. 8 is a flow diagram illustrating a process for detecting malicious activity on an endpoint based on real-time events in accordance with some embodiments.

Example Processes Performed by Malware Analysis System for Detecting Malicious Activity on an Endpoint Based on Real-Time System Events FIG. 8 is a flow diagram illustrating a process for detecting malicious activity on an endpoint based on real-time events in accordance with some embodiments. In one embodiment, process 800 is performed using the system architectures described above (e.g., such as described above with respect to FIGS. 1-7).

At 802, monitoring an endpoint for malicious activity using an endpoint agent is performed. For example, the endpoint can be a local device (e.g., a mobile device, laptop, desktop computer, IoT device, etc.).

At 804, detecting malicious activity associated with an application on the endpoint based on real-time system events using the endpoint agent based on a set of rules is performed.

At 806, in response to detecting malicious activity on the endpoint based on real-time system events using the endpoint agent, a security response based on a security policy is performed.

Figure 9:
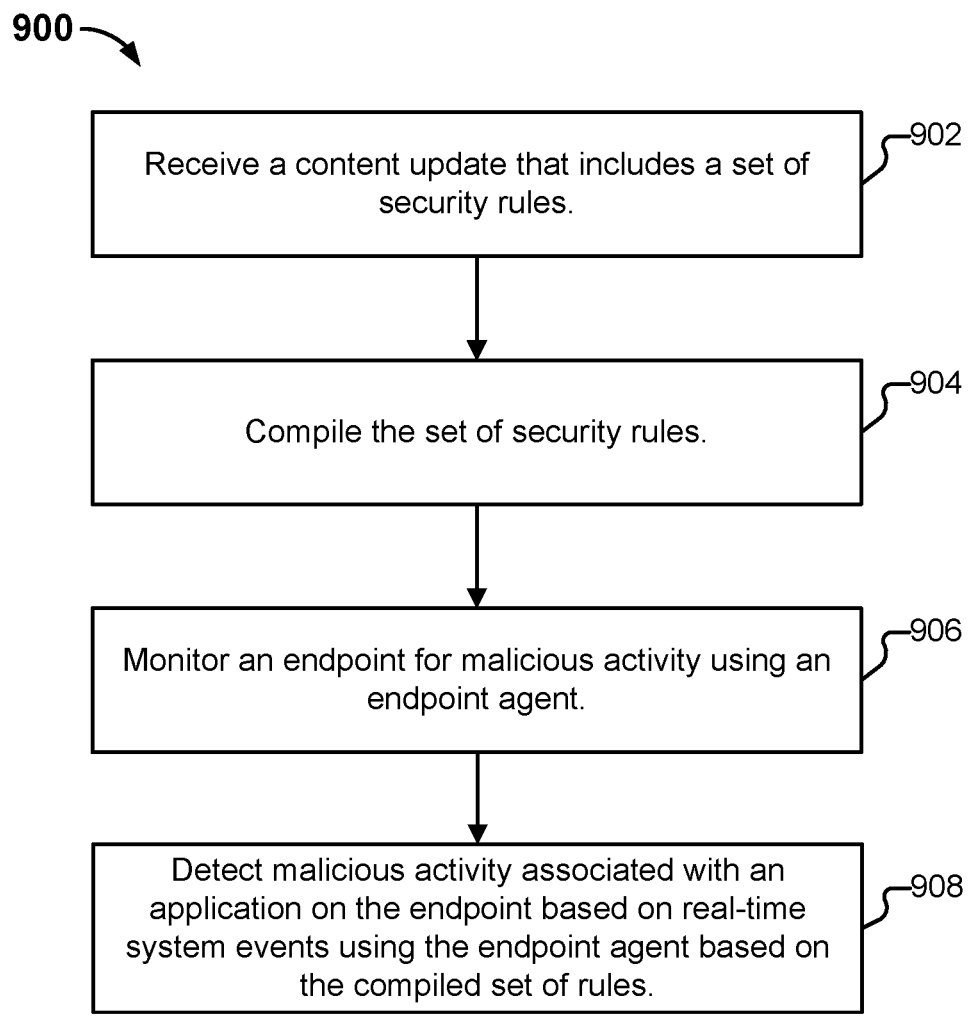
FIG. 9 is another flow diagram illustrating a process for detecting malicious activity on an endpoint based on real-time events in accordance with some embodiments.

FIG. 9 is another flow diagram illustrating a process for detecting malicious activity on an endpoint based on real-time events in accordance with some embodiments. In one embodiment, process 900 is performed using the system architectures described above (e.g., such as described above with respect to FIGS. 1-7).

At 902, a content update that includes a set of security rules is received. As similarly described above, the rules (e.g., behavior threat rules) can be efficiently distributed to endpoint agents as content updates.

At 904, the set of security rules is compiled. For example, the rules can be compiled into a RETE tree for efficient pattern matching using RETE techniques as similarly described above.

At 906, monitoring an endpoint for malicious activity using an endpoint agent is performed. For example, the endpoint can be a local device (e.g., a mobile device, laptop, desktop computer, IoT device, etc.).

At 908, detecting malicious activity associated with an application on the endpoint based on real-time system events using the endpoint agent based on the compiled set of rules is performed. As similarly described above, in response to detecting malicious activity on the endpoint based on real-time system events using the endpoint agent, a security response based on a security policy can be performed.

Figure 10:
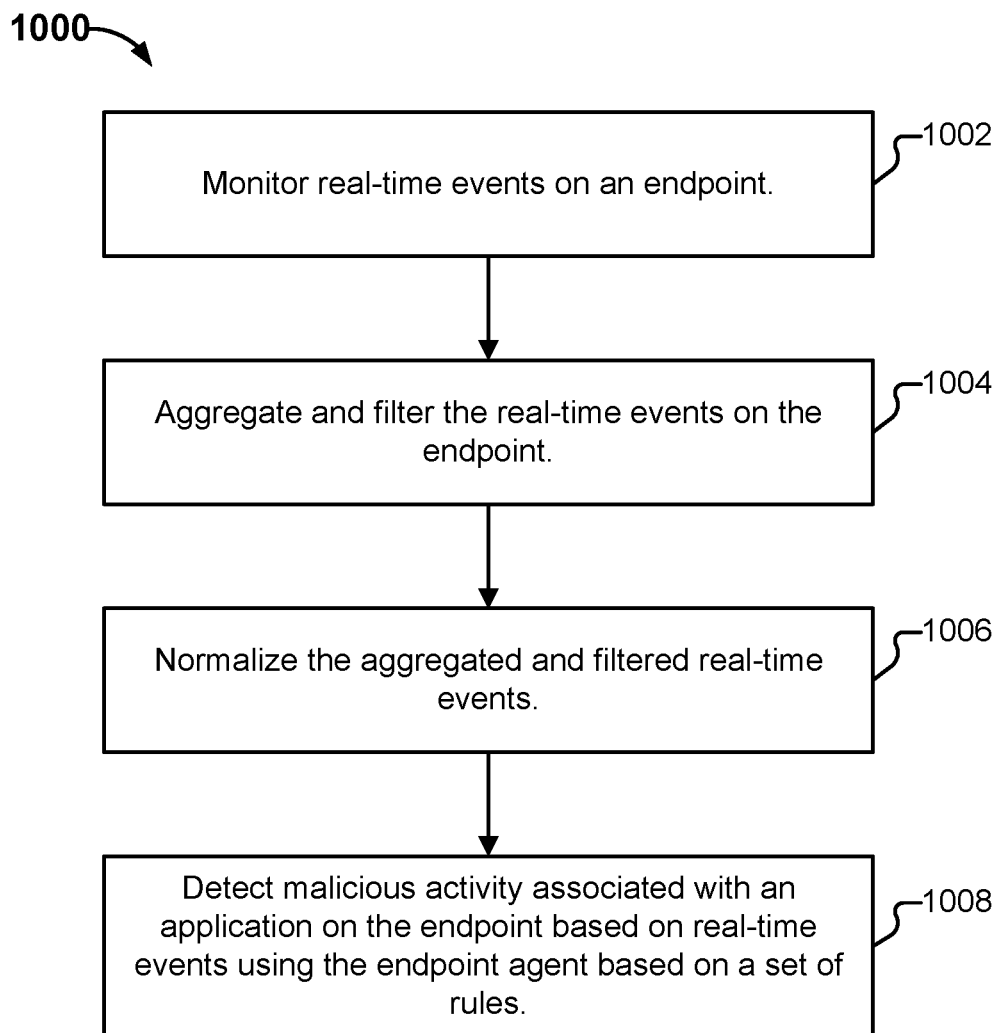
FIG. 10 is another flow diagram illustrating a process for detecting malicious activity on an endpoint based on real-time events in accordance with some embodiments.

FIG. 10 is another flow diagram illustrating a process for detecting malicious activity on an endpoint based on real-time events in accordance with some embodiments. In one embodiment, process 1000 is performed using the system architectures described above (e.g., such as described above with respect to FIGS. 1-7).

At 1002, monitoring real-time events on an endpoint using an endpoint agent is performed. For example, the endpoint can be a local device (e.g., a mobile device, laptop, desktop computer, IoT device, etc.).

At 1004, the real-time events are aggregated and filtered on the endpoint. For example, the events can be filtered to reduce the noise associated with innocuous and/or less critical events, and the filters can be configurable via content updates as similarly described above.

At 1006, the aggregated and filtered real-time events are normalized. For example, the events can be normalized for efficient processing using the CLIPS Engine as similarly described above.

At 1008, detecting malicious activity associated with an application on the endpoint based on real-time events using the endpoint agent based on a set of rules is performed. For example, various behavior threat rules can be configured to detect a pattern of events (e.g., causality chains) associated with malware and/or new threats as similarly described above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a processor configured to:
        monitor an endpoint for malicious activity using an endpoint agent to perform behavioral threat protection by continuously monitoring activities on the endpoint to identify and analyze a set of real-time system events that are associated with a causality event chain, wherein the endpoint comprises a local device;
        filter file system related events, process related events, network related events, and operating system (OS) private application programming interface (API) events based on a filtering policy to filter out events that are noisy and/or are not useful indicators for malware detection using causality event chains, wherein at least the following events are filtered out: predetermined registry key hives and duplicate file-reads;
        detect malicious activity associated with an application on the endpoint based on the causality event chain using the endpoint agent based on a set of rules, wherein the causality event chain is inspected to detect malicious activity based on a pattern of events as opposed to only inspecting each system event individually, wherein the set of rules includes one or more updated detection rules provided as an update to the endpoint agent without requiring a binary or code update, and wherein the set of rules are compiled into a lookup tree for pattern matching using the lookup tree to facilitate optimized detection logic;

in response to detecting malicious activity on the endpoint based on the causality event chain using the endpoint agent, perform a security response based on a security policy that includes the one or more updated detection rules provided as the update to the endpoint agent; and a memory coupled to the processor and configured to provide the processor with instructions.

2. The system of claim 1 wherein the processor is further configured to detect an attempt by the application to take an action that would violate the set of rules, wherein the lookup tree is implemented as a Rete tree that is compiled to provide optimized detection logic based on an optimized decision tree.

3. The system of claim 1, wherein the processor is further configured to detect an attempt by the application to take an action that would violate the set of rules, and wherein the set of rules comprises a whitelisted set of behaviors observed at a remote server during emulation of a sample in a virtualized environment and wherein an attempt by the application while executing on the local device to take an action not included in the whitelisted set of behaviors constitutes a rule violation.

4. The system of claim 1, wherein the processor is further configured to:
 detect an attempt by the application to take an action that would violate the set of rules, and
 report the attempt to a user of the endpoint.

5. The system of claim 1, wherein the processor is further configured to:
 detect an attempt by the application to take an action that would violate the set of rules, and
 report the attempt to a remote server.

6. The system of claim 1, wherein the processor is further configured to report the detected malicious activity to a remote server, wherein in response to receiving the report, the remote server performs an evaluation of a sample provided by the endpoint, wherein the sample is associated with the detected malicious activity.

7. The system of claim 1, wherein the set of rules restrict processes associated with a sample to behaviors observed during an execution of the sample in a virtualized environment.

8. The system of claim 1, wherein a remote server is configured to evaluate an updated version of the application in response to receiving an indication that the application has been updated.

9. The system of claim 1, wherein a remote server is configured to evaluate the application at least in part by executing the application in a virtualized environment, and wherein endpoint agent is configured to implement, at the endpoint, a set of rules restricting behaviors of an application.

10. A method, comprising:
 monitoring an endpoint for malicious activity using an endpoint agent to perform behavioral threat protection by continuously monitoring activities on the endpoint to identify and analyze a set of real-time system events that are associated with a causality event chain, wherein the endpoint comprises a local device;

filtering file system related events, process related events, network related events, and operating system (OS) private application programming interface (API) events based on a filtering policy to filter out events that are noisy and/or are not useful indicators for malware detection using causality event chains, wherein at least the following events are filtered out: predetermined registry key hives and duplicate file-reads;

detecting malicious activity associated with an application on the endpoint based on the causality event chain using the endpoint agent based on a set of rules, wherein the causality event chain is inspected to detect malicious activity based on a pattern of events as opposed to only inspecting each system event individually, wherein the set of rules includes one or more updated detection rules provided as an update to the endpoint agent without requiring a binary or code update, and wherein the set of rules are compiled into a lookup tree for pattern matching using the lookup tree to facilitate optimized detection logic; and in response to detecting malicious activity on the endpoint based on the causality event chain using the endpoint agent, performing a security response based on a security policy that includes the one or more updated detection rules provided as the update to the endpoint agent.

11. The method of claim 10 further comprising detecting an attempt by the application to take an action that would violate the set of rules, wherein the lookup tree is implemented as a Rete tree that is compiled to provide optimized detection logic based on an optimized decision tree.

12. The method of claim 10 further comprising detecting an attempt by the application to take an action that would violate the set of rules, and wherein the set of rules comprises a whitelisted set of behaviors observed at a remote server during emulation of a sample in a virtualized environment and wherein an attempt by the application while executing on the local device to take an action not included in the whitelisted set of behaviors constitutes a rule violation.

13. The method of claim 10 further comprising:
 detecting an attempt by the application to take an action that would violate the set of rules; and
 reporting the attempt to a user of the endpoint.

14. The method of claim 10 further comprising:
 detect an attempt by the application to take an action that would violate the set of rules, and
 report the attempt to a remote server.

15. The method of claim 10 further comprising reporting the detected malicious activity to a remote server, wherein in response to receiving the report, the remote server performs an evaluation of a sample provided by the endpoint, wherein the sample is associated with the detected malicious activity.

16. The method of claim 10, wherein the set of rules restrict processes associated with a sample to behaviors observed during an execution of the sample in a virtualized environment.

17. The method of claim 10 wherein a remote server is configured to evaluate an updated version of the application in response to receiving an indication that the application has been updated.

18. The method of claim 10, wherein a remote server is configured to evaluate the application at least in part by executing the application in a virtualized environment, and wherein endpoint agent is configured to implement, at the endpoint, a set of rules restricting behaviors of an application.

19. A computer program product, the computer program product being embodied in a non-transitory computer readable storage medium and comprising computer instructions for:
  monitoring an endpoint for malicious activity using an endpoint agent to perform behavioral threat protection by continuously monitoring activities on the endpoint to identify and analyze a set of real-time system events that are associated with a causality event chain, wherein the endpoint comprises a local device;
  filtering file system related events, process related events, network related events, and operating system (OS) private application programming interface (API) events based on a filtering policy to filter out events that are noisy and/or are not useful indicators for malware detection using causality event chains, wherein at least the following events are filtered out: predetermined registry key hives and duplicate file-reads;
  detecting malicious activity associated with an application on the endpoint based on the causality event chain using the endpoint agent based on a set of rules, wherein the causality event chain is inspected to detect malicious activity based on a pattern of events as opposed to only inspecting each system event individually, wherein the set of rules includes one or more updated detection rules provided as an update to the endpoint agent without requiring a binary or code update, and wherein the set of rules are compiled into a lookup tree for pattern matching using the lookup tree to facilitate optimized detection logic; and
  in response to detecting malicious activity on the endpoint based on the causality event chain using the endpoint agent, performing a security response based on a security policy that includes the one or more updated detection rules provided as the update to the endpoint agent.

20. The computer program product recited in claim 19, further comprising computer instructions for:
  detecting an attempt by the application to take an action that would violate the set of rules, wherein the set of rules includes one or more updated detection rules.

21. The system of claim 1, wherein the following file system related events are configured to not be filtered out: file read operations for predetermined sensitive files and a threshold number of reads to a database.

* * * * *

UNITED STATES PATENT AND TRADEMARK OFFICE
CERTIFICATE OF CORRECTION

PATENT NO. : 11,683,329 B2  
APPLICATION NO. : 16/800333  
DATED : June 20, 2023  
INVENTOR(S) : Roni Moshitzky et al.

Page 1 of 1

It is certified that error appears in the above-identified patent and that said Letters Patent is hereby corrected as shown below:

In the Specification

In Column 15, Line 61, delete "(observd)" and insert --(observed)--, therefor.
In Column 20, Line 8, delete "from" and insert --of--, therefor.
In Column 21, Line 57, delete "SIR" and insert --STR--, therefor.

In the Claims

In Column 27, Line 18, Claim 2, after "claim 1", insert --,--.
In Column 28, Line 61, Claim 17, after "claim 10", insert --,--.

Signed and Sealed this  
Twenty-first Day of November, 2023

Katherine Kelly Vidal  
*Director of the United States Patent and Trademark Office*